US012745090B2

(12) United States Patent
Samosseiko et al.

(10) Patent No.: US 12,745,090 B2
(45) Date of Patent: *Sep. 22, 2026

(54) NETWORK-LEVEL ELEVATED SECURITY EXECUTION MODES FOR NETWORK-ACCESSIBLE DEVICES

(71) Applicant: SOPHOS LIMITED, Abingdon (GB)

(72) Inventors: Dmitry Samosseiko, Vancouver (CA); Fraser Peter Howard, Oxford (GB); Michael David Wood, Vancouver (CA); Andrew James Thomas, Abingdon (GB); Benjamin James Humphrey, Norfolk (GB); Xiaochuan Zhang, Abingdon (GB); Paul Barrie Ducklin, Oxford (GB); Anand Ajjan, New Westminster (CA)

(73) Assignee: SOPHOS LIMITED, Abingdon Oxfordshhire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/423,775

(22) Filed: Jan. 26, 2024

(65) Prior Publication Data

US 2024/0414176 A1 Dec. 12, 2024

Related U.S. Application Data

(60) Provisional application No. 63/506,503, filed on Jun. 6, 2023.

(51) Int. Cl.

*G06F 21/55* (2013.01)
*G06F 9/445* (2018.01)

(Continued)

(52) U.S. Cl.

CPC ........ *H04W 12/37* (2021.01); *G06F 9/44521* (2013.01); *G06F 21/52* (2013.01);

(Continued)

(58) Field of Classification Search

None

See application file for complete search history.

(56) References Cited

U.S. PATENT DOCUMENTS 8,806,638 B1 * 8/2014 Mani .................... G06F 21/552 726/4
10,997,284 B2 5/2021 Bailey (Continued)

OTHER PUBLICATIONS

Seqrite, Seqrite Endpoint Security 7.6, Feb. 19, 2021, "docs.seqrite.com/docs/seqrite-eps/settings/client-settings/general-settings/", 2 pages (Year: 2019).*

(Continued)

*Primary Examiner* — Christopher C Harris
(74) *Attorney, Agent, or Firm* — IP Spring

(57) ABSTRACT

Various aspects related to methods, systems, and computer readable media for detection and blocking of security threats for network-accessible devices. Methods can include monitoring network traffic on a computer network, detecting an indication of a security threat to at least one endpoint, determining that the device threat type is a threat type that requires elevated security measures, responsive to the determining that the device threat type requires elevated security measures, updating a network-access policy for the plurality of endpoints with the threat type, and after the updating, automatically remediating the security threat on the at least one endpoint within a first time period.

20 Claims, 13 Drawing Sheets

(51) Int. Cl.

| | |
|---|---|
| ***G06F 21/52*** | (2013.01) |
| ***G06F 21/56*** | (2013.01) |
| ***H04L 9/40*** | (2022.01) |
| ***H04W 12/37*** | (2021.01) |

(52) U.S. Cl.

CPC ............ *G06F 21/554* (2013.01); *G06F 21/56* (2013.01); *H04L 63/1416* (2013.01); *H04L 63/1441* (2013.01)

(56) References Cited

U.S. PATENT DOCUMENTS

| | | | | |
|---|---|---|---|---|
| 12,326,936 | B2 | 6/2025 | Zawadowskiy et al. | |
| 2009/0313699 | A1 | 12/2009 | Jang | |
| 2012/0120023 | A1 | 5/2012 | Huang | |
| 2012/0216242 | A1 | 8/2012 | Uner | |
| 2014/0007222 | A1 | 1/2014 | Qureshi | |
| 2016/0042181 | A1 | 2/2016 | Kruglick | |
| 2016/0127367 | A1 | 5/2016 | Jevans | |
| 2016/0212171 | A1 | 7/2016 | Senanayake et al. | |
| 2016/0217029 | A1 | 7/2016 | Yoon | |
| 2016/0218933 | A1 | 7/2016 | Porras et al. | |
| 2016/0219048 | A1 | 7/2016 | Porras et al. | |
| 2016/0219078 | A1 | 7/2016 | Porras et al. | |
| 2017/0061126 | A1 | 3/2017 | Hooks | |
| 2017/0339178 | A1 | 11/2017 | Mahaffey | |
| 2018/0159887 | A1 | 6/2018 | Digiambattista | |
| 2018/0212998 | A1* | 7/2018 | Ahuja | G06F 9/45558 |
| 2019/0260785 | A1 | 8/2019 | Jenkinson et al. | |
| 2019/0268303 | A1* | 8/2019 | Schiappa | H04L 63/0227 |
| 2019/0273760 | A1* | 9/2019 | Jacobs | H04L 63/20 |
| 2019/0342311 | A1 | 11/2019 | Muddu et al. | |
| 2020/0036434 | A1 | 1/2020 | Van Wynsberghe | |
| 2020/0065498 | A1 | 2/2020 | Wang et al. | |
| 2020/0067961 | A1 | 2/2020 | Qin et al. | |
| 2020/0210435 | A1 | 7/2020 | Bendel | |
| 2020/0285752 | A1 | 9/2020 | Wyatt | |
| 2020/0327225 | A1 | 10/2020 | Nguyen | |
| 2020/0364345 | A1 | 11/2020 | Hecht et al. | |
| 2020/0404007 | A1 | 12/2020 | Singh | |
| 2021/0014256 | A1* | 1/2021 | Malhotra | H04L 63/1433 |
| 2021/0097186 | A1 | 4/2021 | Mandel | |
| 2021/0120023 | A1 | 4/2021 | Gupta et al. | |
| 2021/0273953 | A1 | 9/2021 | Fellows et al. | |
| 2021/0273958 | A1 | 9/2021 | Mclean | |
| 2021/0273961 | A1 | 9/2021 | Humphrey et al. | |
| 2022/0038486 | A1 | 2/2022 | Baragaba et al. | |
| 2022/0156657 | A1 | 5/2022 | Brannon et al. | |
| 2022/0222338 | A1 | 7/2022 | Gupta | |
| 2022/0329604 | A1 | 10/2022 | Guy et al. | |
| 2022/0360597 | A1 | 11/2022 | Fellows et al. | |
| 2023/0009127 | A1 | 1/2023 | Boyer | |
| 2023/0011004 | A1 | 1/2023 | Fellows et al. | |
| 2023/0090785 | A1 | 3/2023 | Nunn | |
| 2023/0095415 | A1 | 3/2023 | Boyer et al. | |
| 2023/0164567 | A1 | 5/2023 | Fellows et al. | |
| 2023/0239303 | A1 | 7/2023 | Hutelmyer et al. | |
| 2023/0325511 | A1 | 10/2023 | Jaster | |
| 2024/0080323 | A1 | 3/2024 | Balmakhtar et al. | |
| 2024/0089273 | A1* | 3/2024 | Aslaner | H04L 63/1416 |
| 2024/0126873 | A1* | 4/2024 | Philip | G06F 21/554 |
| 2024/0152618 | A1 | 5/2024 | Cohen | |
| 2024/0275817 | A1* | 8/2024 | Grout | H04L 63/1425 |
| 2024/0291837 | A1* | 8/2024 | Levari | H04L 63/1425 |
| 2025/0030716 | A1 | 1/2025 | Cross et al. | |

OTHER PUBLICATIONS

"USPTO", Non-Final office action for U.S. Appl. No. 18/423,801, 22 pages.

Kamruzzaman, Abu, "A Comprehensive Review of Endpoint Security: Threats and Defenses", International Conference on Cyber Warfare and Security (ICCWS), 2022, 1-7 pages.

Arefi, M.N.; Alexander, G.; Rokham, H .; Chen, A.; Faloutsos, M .; Wei, X.; "FAROS: Illuminating In-memory Injection Attacks via Provenance-Based Whole-System Dynamic Information Flow Tracking," 48th Annual IEEE/IFIP Intl Conf on Dependable Systems and Networks (DSN), Luxembourg, IEEE, Jun. 25-28, 2018, pp. 231-242.

Liu, T.; Shi, G; Chen, L.; Zhang, F.; Yang, Y.; Zhang, J.; "TMDFI: Tagged Memory Assisted for Fine-Grained Data-Flow Integrity Towards Embedded Systems Against Software Exploitation," 17th IEEE Intl Conf On Trust, Security And Privacy In Computing And Communications, New York, IEEE, Aug. 1-3, 2018, pp. 545-550.

"Final Office Action in U.S. Appl. No. 18/423,801", Dec. 17, 2025, 21 pages.

"Notice of Allowance in U.S. Appl. No. 18/423,838", Mar. 3, 2026.

Non-Final Office Action in U.S. Appl. No. 18/423,814, Sep. 10, 2025.

"Non-Final Office Action in U.S. Appl. No. 18/423,838", Sep. 24, 2025, 20 pages.

"Non-Final Office Action in U.S. Appl. No. 18/423,801", Apr. 2, 2026.

* cited by examiner

Marketplace Provider 199

Identity Provider 158

SAAS Application 156

Policy Management 112

Definitions 114

Updates 120

Analytics 168

Dynamic Policies 170

Marketplace Interface 174

Security Management 122

Network Access 124

Remedial Actions 128

Event Logging 166

Asset Classification 160

Identity Management 172

Detection Techniques 130

Event Collection 164

Entity Models 162

Application Protection 150

Threat Management Facility 100

Network 154

S Mobile Device 26

S Endpoint 22

S Cloud Computing Instance 109

Firewall 10

Wireless Access Point 11

S Endpoint 12

S Server 14

S Server 20

S Mobile Device 16

IoT Device 18

S Cloud Computing Instance 19

Enterprise Facility 102

101

NOTE: S = Security Agent

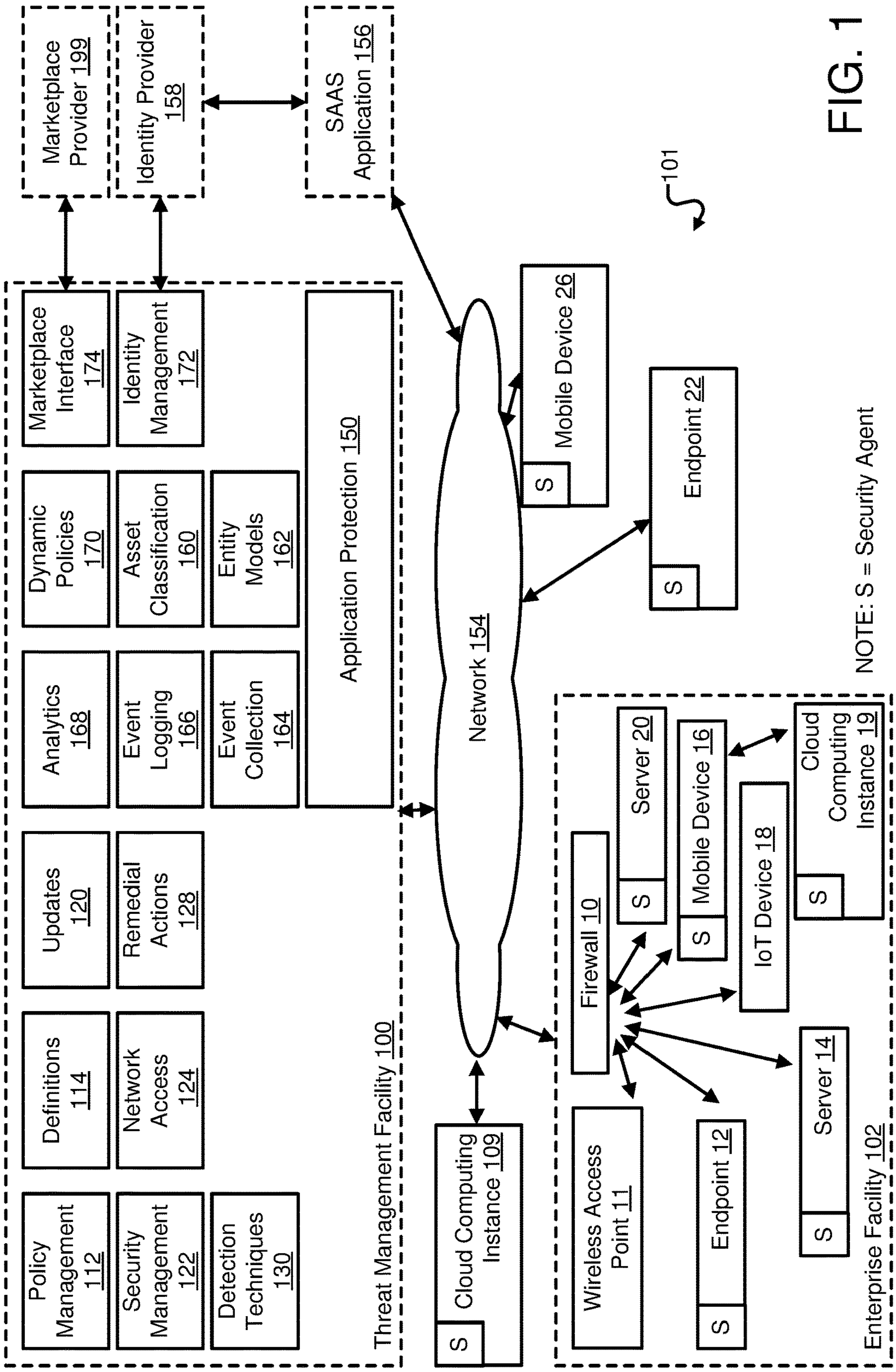

FIG. 1

Marketplace Provider 199
Identity Provider 158
Cloud Enterprise Facility 280
S Server 284
S Server 286
Firewall 282
Marketplace Interface 174
Identity Management 172
Dynamic Policies 170
Asset Classification 160
Entity Models 162
Analytics 168
Event Logging 166
Event Collection 164
Application Protection 150
Updates 120
Remedial Actions 128
Definitions 114
Network Access 124
Policy Management 112
Security Management 122
Detection Techniques 130
Threat Management Facility 100
Network 154
S Mobile Device 26
S Endpoint 22
201
Cloud Computing Instance 109
S
Firewall 10
S Server 20
S Mobile Device 16
IoT Device 18
S Cloud Computing Instance 19
Wireless Access Point 11
S Endpoint 12
S Server 14
Enterprise Facility 102
NOTE: S = Security Agent

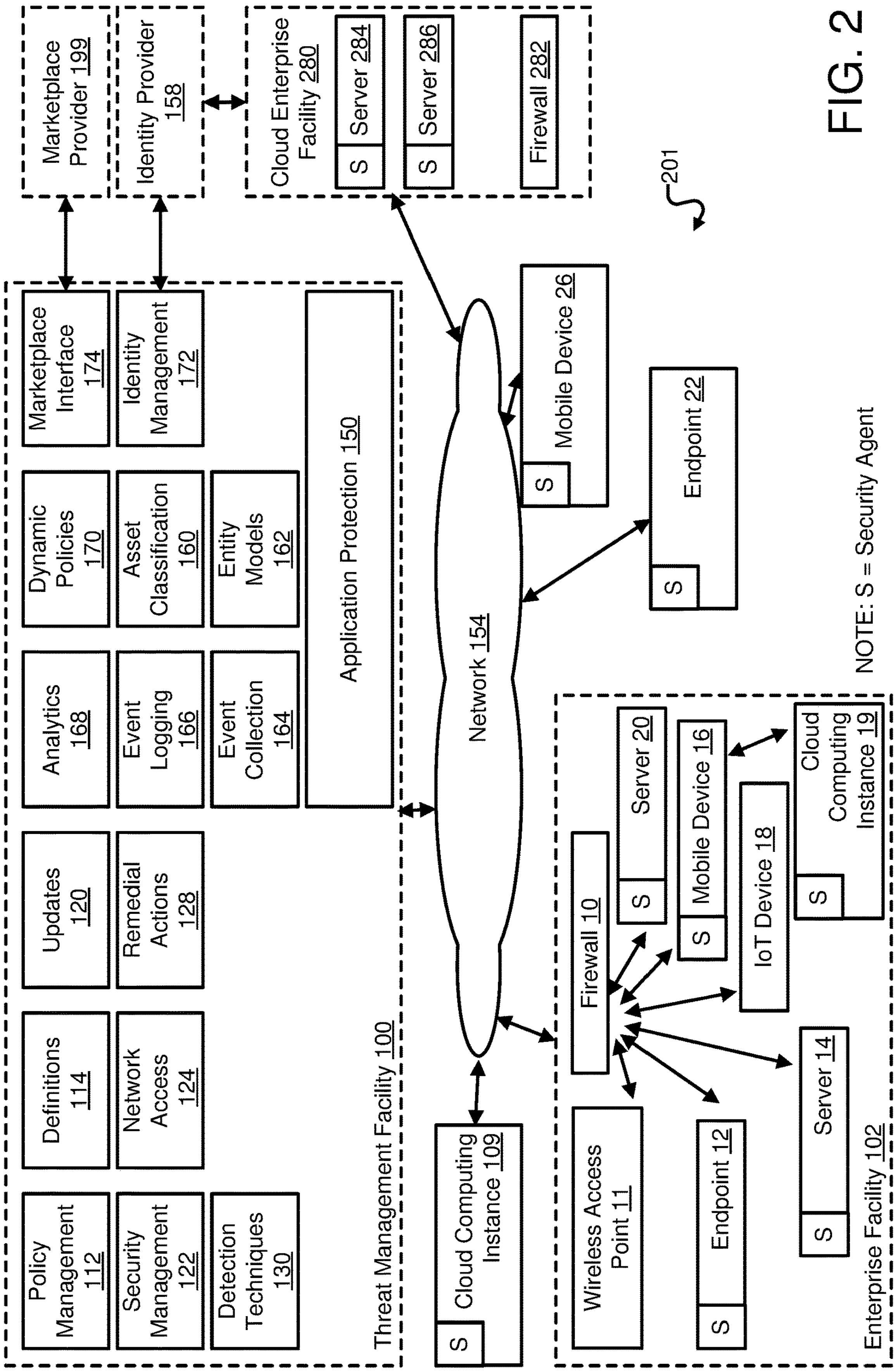

FIG. 2

Endpoint With Security Threat

Other Endpoints

Remote Device

802 Indication of Security Threat

802 Indication of Security Threat

802 Indication of Security Threat

804 Determine Threat Type

806 Command to Elevate Security

808 Elevate Security Measures

810 Command to Remediate Threat

812 Security Software Remediates Threat

814 Command to Return to Prior Security

NETWORK-LEVEL ELEVATED SECURITY EXECUTION MODES FOR NETWORK-ACCESSIBLE DEVICES

CROSS-REFERENCE TO RELATED APPLICATIONS

This application claims the benefit of priority to U.S. Provisional Application Ser. No. 63/506,503, filed on Jun. 6, 2023, entitled "NETWORK-LEVEL ELEVATED SECURITY EXECUTION MODES FOR NETWORK-ACCESSIBLE DEVICES," the entire contents of which are hereby incorporated by reference herein.

TECHNICAL FIELD

Embodiments relate generally to threat management in a computer network, and more particularly, to methods, systems, and computer readable media for detection and blocking of security threats for network-accessible devices.

BACKGROUND

With continually evolving computer security threats, there remains a need for automated, semi-automated, and manual techniques to quickly mitigate security threats.

SUMMARY

Implementations of this application relate to methods, systems, and computer readable media for detection and blocking of security threats for network-accessible devices.

BRIEF DESCRIPTION OF THE DRAWINGS

FIG. 1 is a diagram of an example enterprise network threat management system, in accordance with some implementations.

FIG. 2 is a diagram of an example enterprise network threat management system, in accordance with some implementations.

DETAILED DESCRIPTION

Figure 3:
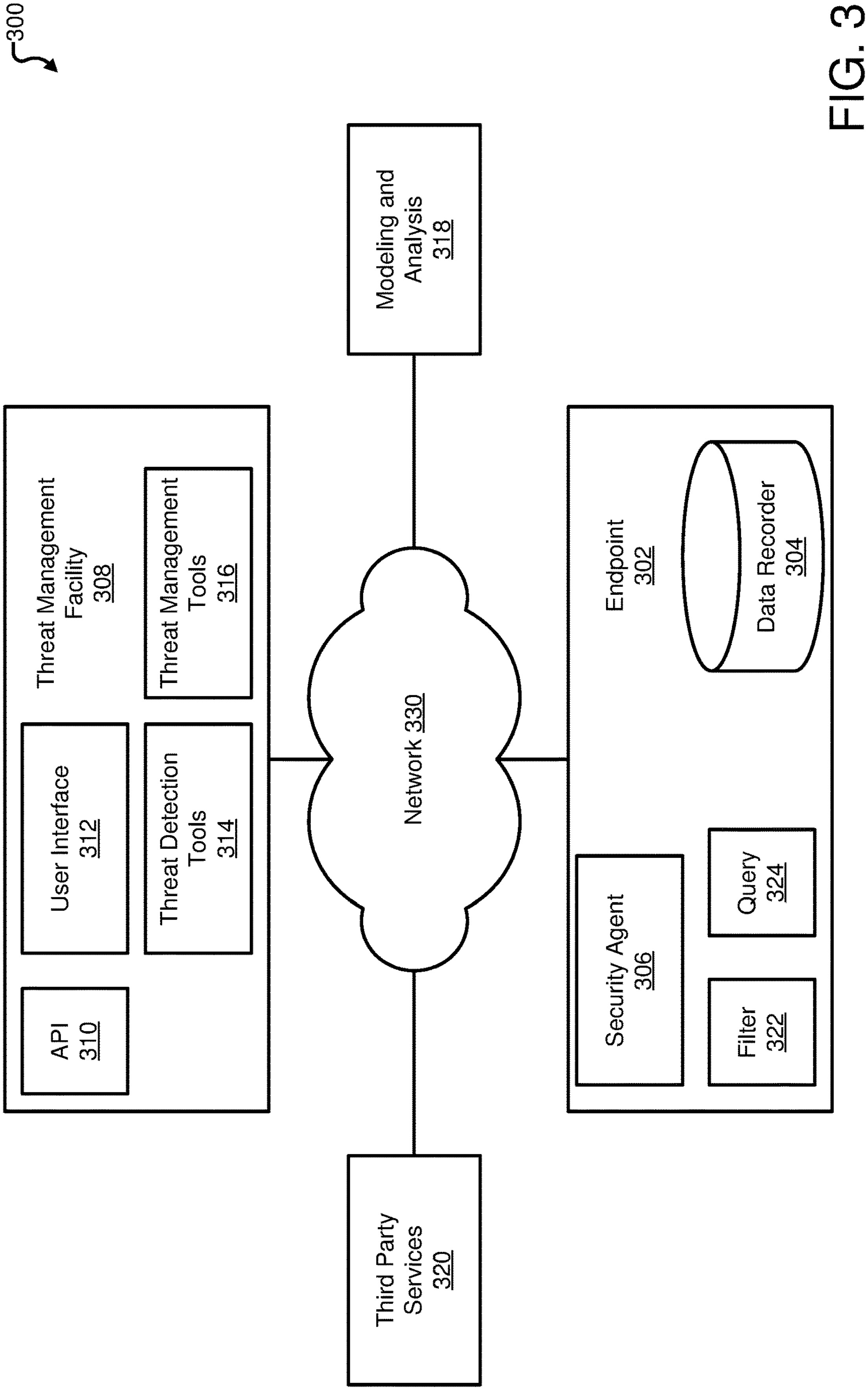
FIG. 3 is a schematic of an example enterprise network threat management system, in accordance with some implementations.

One or more implementations described herein relate to mitigating security threats on computer networks, to mitigate active security threats on endpoints operatively coupled to a computer network, and to manage threats based on indicators of compromise. Generally, computer networks may allow access by a plurality of endpoints and/or user devices. Network administrators or security management tools may monitor these and other endpoints for active security threats based on established guidelines, implement network-access policies based on established guidelines, and/or remediate individual endpoints based on active security threats uncovered during the monitoring.

In a given computer network, there may be endpoints operatively connected thereto, and configured to transmit and receive network traffic. Endpoints may have security software that is administered by the network administrators, and may have an agent (e.g., security agent, administrative agent, or other security software) that can report the security status of the endpoint. An administrator that wants to determine the security status of an endpoint may be able to access a management console on premise at the enterprise or in the cloud to determine the status of a given endpoint or to see a report of the security status (e.g., security state) of a given endpoint.

The security status can include, for example, whether a given endpoint has a security agent running and whether that agent has the latest updates (e.g., security patches or software updates). The security status can include, for example, whether the device has the latest operating system updates or updates for other applications that execute on the endpoint. The security status can include, for example, whether the device performs regular lookups in association with other network traffic. The security status can also include, for example, whether the endpoint device checks for updates associated with software on the endpoint. The security status can also include, for example, whether the endpoint communicates status information or other information to a security or administrative server. The security status can also include, for example, whether the endpoint had an indicator of compromise or an indication of a security threat associated therewith.

Other security statuses, including security statuses or indications of security threats based on other, connected endpoints, may also be provided. For example, remote devices (i.e., a type of endpoint) may be configured to monitor network traffic for endpoints to determine if a security threat exists or is probable to exist on any particular endpoint. For example, other endpoints may distribute and/or transmit an indication of a security threat for a different endpoint based upon network traffic that originated at the different endpoint. For example, other endpoints may distribute and/or transmit an indication of a security threat for a different endpoint based upon indicators of compromise observed by a security agent operating thereon.

Other security statuses, including different indications of security threats, may also be applicable, including remote security statuses, local security statuses, and network or sub-network security statuses.

However, even if a given endpoint is managed with security software, some endpoints on a network may still be at risk if the affected endpoint remains connected to the computer network with an existing security threat. For example, the affected endpoint may transmit malware or malicious code to other endpoints, may access sensitive content or data from the other endpoints, may attempt to infiltrate other endpoints, and others. Accordingly, while typical security software may attempt to remediate security threats on endpoints, the endpoints may still pose security risks even while undergoing remediation.

While the affected endpoint or endpoints can be taken offline (e.g., removed from the computer network and/or otherwise disabled), often such an outcome adversely affects functionality of the computer network. For example, routine functions of the affected endpoint may be important for business purposes, security processes, and other reasons. In these and other examples, it may be beneficial to attempt to remediate the endpoint, while limiting the probability of the affected endpoint of transmitting malicious code, and while allowing the endpoint to remain functional so as not to disrupt other core functions. In this manner, an affected endpoint may retain some functionality so as to mitigate disruption of core functions, with other functions limited to prevent the spread of malicious code on the computer network.

The below detailed description is presented in reference to these and other scenarios where endpoints connected to a computer network may need remediation while connected to the network and/or without being taken offline.

FIG. 1 depicts a block diagram of a threat management system 101 providing protection against a plurality of threats, such as malware, viruses, spyware, cryptoware, adware, ransomware, trojans, spam, intrusion, policy abuse, improper configuration, vulnerabilities, improper access, uncontrolled access, and more. A threat management facility or network monitor 100 may communicate with, coordinate, and control operation of security functionality at different control points, layers, and levels within the system 101. A number of capabilities may be provided by the threat management facility 100, with an overall goal to intelligently monitor for indications of a security threat affecting one or more endpoints. The threat management facility 100 can monitor the network traffic passively and analyze the traffic. The threat management facility 100 can request endpoints to provide regular security statuses, updates, and/or indications of compromise related to adjacent or nearby nodes/endpoints. The threat management facility 100 may be or may include a gateway such as a web security appliance that is actively routing and/or assessing the network requests for security purposes. Another overall goal is to provide protection needed by an organization that is dynamic and able to adapt to changes in compute instances and new threats due to emerging threats on the enterprise network, while retaining at least some core functionality (e.g., without taking too many endpoints offline). According to various aspects, the threat management facility 100 may provide protection from a variety of threats to a variety of compute instances in a variety of locations and network configurations.

As one example, users of the threat management facility 100 may define and enforce policies that control access to and use of compute instances, networks, and data. Administrators may update policies such as by designating authorized users and conditions for use and access. The threat management facility 100 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 100 may provide many different services, and policy management may be offered as one of the services.

Turning to a description of certain capabilities and components of the threat management system 100, an example enterprise facility 102 may be or may include any networked computer-based infrastructure. For example, the enterprise facility 102 may be corporate, commercial, organizational, educational, governmental, or the like. As home networks can also include more compute instances at home and in the cloud, an enterprise facility 102 may also or instead include a personal network such as a home or a group of homes. The enterprise facility's 102 computer network may be distributed amongst a plurality of physical premises such as buildings on a campus, and located in one or in a plurality of geographical locations. The configuration of the enterprise facility as shown as one example, and it will be understood that there may be any number of compute instances, less or more of each type of compute instances, and other types of compute instances.

As shown, the example enterprise facility includes a firewall 10, a wireless access point 11, an endpoint 12, a server 14, a mobile device 16, an appliance or Internet-of-Things (IoT) device 18, a cloud computing instance 19, and a server 20. One or more of 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these for example only, and there may be any number or types of elements in a given enterprise facility. For example, in addition to the elements depicted in the enterprise facility 102, there may be one or more gateways, bridges, wired networks, wireless networks, virtual private networks, virtual machines or compute instances, computers, and so on.

The threat management facility 100 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 100 may be implemented in whole or in part on a number of different compute instances, with some parts of the threat management facility on different compute instances in different locations. For example, some or all of one or more of the various facilities 100, 112-174 may be provided as part of a security agent S that is included in software running on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In various implementations, a marketplace provider 199 may make available one or more additional facilities to the enterprise facility 102 via the threat management facility 100. The marketplace provider may communicate with the threat management facility 100 via the marketplace interface facility 174 to provide additional functionality or capabilities to the threat management facility 100 and compute instances 10-26. As examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122. According to some implementations, the marketplace provider 199 is a trusted security vendor that can provide one or more security software products to any of the compute instances described herein. In this manner, the marketplace provider 199 may include a plurality of trusted security vendors that are used by one or more of the illustrated compute instances.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

The identity provider 158 may provide user identity information, such as multi-factor authentication, to a software-as-a-service (SaaS) application. Centralized identity providers may be used by an enterprise facility instead of maintaining separate identity information for each application or group of applications, and as a centralized point for integrating multifactor authentication. The identity management facility 172 may communicate hygiene, or security risk information, to the identity provider 158. The identity management facility 172 may determine a risk score for a particular user based on events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

The threat protection provided by the threat management facility 100 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth.

In some implementations, compute instances 10-26 may communicate with cloud applications, such as SaaS application 156. The SaaS application 156 may be an application that is used by but not operated by the enterprise facility 102. Example commercially available SaaS applications 156 include Salesforce, Amazon Web Services (AWS) applications, Google Apps applications, Microsoft Office 365 applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

Aspects of the threat management facility 100 may be provided as a stand-alone solution. In other implementations, aspects of the threat management facility 100 may be integrated into a third-party product. An application programming interface (e.g. a source code interface) may be provided such that aspects of the threat management facility 100 may be integrated into or used by or with other applications. For instance, the threat management facility 100 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 100 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an implementation, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an implementation, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, URI filtering, and the like. Aspects of the web security and control may be provided, for example, in the security agent of an endpoint 12, in a wireless access point 11 or firewall 10, as part of application protection 150 provided by the cloud, and so on.

According to one implementation, the security management facility 122 may provide for network monitoring and access control, which generally controls access to and use of network connections, while also allowing for monitoring as described herein. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. According to various implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 100 or other network resource(s).

The security management facility 122 may also provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

The security management facility 122 may provide also for reputation filtering, which may target or identify sources of known malware. For instance, reputation filtering may include lists of URIs of known sources of malware or known suspicious IP addresses, code authors, code signers, or domains, that when detected may invoke an action by the threat management facility 100. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

According to some implementations, the security management facility 122 may also provide for remote direction of particular endpoints to elevate security measures, as described herein. For example, the elevated security measures may include a safe operating mode whereby an endpoint (such as a client or user device 22, 26) has at least a portion of suspected malicious processes "blocked" (e.g., by limiting network-access, disk-access, and other access) until a security threat is remediated. Aspects of elevated security measures, elevated security modes, and others, may be provided, for example, in the security agent of an endpoint 12, in a wireless access point 11 or firewall 10, as part of application protection 150 provided by the cloud, and so on. Other portions of the threat management facility 100 may also provide elevated security measure functionality for particular endpoints, including security agents executed on endpoints themselves.

In some implementations, information may be sent from the enterprise facility 102 to a third party, such as a security vendor, or the like, which may lead to improved performance of the threat management facility 100. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. Feedback may enable the evaluation or profiling of client actions that are violations of policy that may provide a predictive model for the improvement of enterprise policies as well as detection of emerging security threats.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

The threat management facility 100 may include a policy management facility 112 that manages rules or policies for the enterprise facility 102. Example rules include access permissions associated with networks, applications, compute instances, users, content, data, and the like. The policy management facility 112 may use a database, a text file, other data store, or a combination to store policies. A policy database may include a block list, a black list, an allowed list, a white list, and more. As non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Example policies may be defined for an enterprise facility, application type, subset of application capabilities, organization hierarchy, compute instance type, user type, network location, time of day, connection type, or any other suitable definition. Policies may be maintained through the threat management facility 100, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In one implementation, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

The threat management facility 100 may provide configuration management as an aspect of the policy management facility 112, the security management facility 122, or a combination thereof. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of USB disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

The policy management facility 112 may also require update management (e.g., as provided by the update facility 120). Update management for the security facility 122 and policy management facility 112 may be provided directly by the threat management facility 100, or, for example, by a hosted system. In some implementations, the threat management facility 100 may also provide for patch management, where a patch may be an update to an operating system, an application, a system tool, or the like, where one of the reasons for the patch is to reduce vulnerability to threats.

According to some implementations, the policy management facility 112 may also provide network-level elevated security measures based on an indication of a security threat to an endpoint, as described herein. For example, the network-level elevated security measures may include a "shunning" of an affected endpoint (such as a client or user device 22, 26) such that other endpoints effectively ignore the endpoint until a security threat is remediated. Aspects of network-level elevated security measures, network-level elevated security modes, and others, may be provided, for example, as an updated network-access policy that is pushed to a plurality of endpoints on a computer network. Other portions of the threat management facility 100 may also provide elevated security measure functionality for network-level measures, such as through increased security measures at access-points, file or data storage devices, and others.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In one implementation, the policy management facility 112 and the security facility 122 may work in concert with the update management facility 120 to provide information to the enterprise facility's 102 network and/or compute instances 10-26. In various implementations, policy updates, security updates, and other updates may be provided by the same or different modules, which may be the same or separate from a security agent running on one of the compute instances 10-26. Furthermore, the policy updates, security updates, and other updates may be monitored through network traffic to determine if endpoints or compute instances 10-26 correctly receive the associated updates.

As threats are identified and characterized, the definition facility 114 of the threat management facility 100 may manage definitions used to detect and remediate threats. For example, identity definitions may be used for recognizing features of known or potentially malicious code and/or known or potentially malicious network activity. Definitions also may include, for example, code or data to be used in a classifier, such as a neural network or other classifier that may be trained using machine learning. Updated code or data may be used by the classifier to classify threats. In some implementations, the threat management facility 100 and the compute instances 10-26 may be provided with new definitions periodically to include most recent threats. Updating of definitions may be managed by the update facility 120, and may be performed upon request from one of the compute instances 10-26, upon a push, or some combination. Updates may be performed upon a time period, on demand from a device 10-26, upon determination of an important new definition or a number of definitions, and so on.

A threat research facility (not shown) may provide a continuously ongoing effort to maintain the threat protection capabilities of the threat management facility 100 in light of continuous generation of new or evolved forms of malware. Threat research may be provided by researchers and analysts working on known threats, in the form of policies, definitions, remedial actions, and so on. Such threat research may be used to inform indications of security threats on individual endpoints, groups of endpoints, and so on, for both endpoint-level elevated security measures and/or network-level elevated security measures, as described herein.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 100 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need-to-know data, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 100 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows, MacOS, Linux, Android, iOS). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that accessed through an API. As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An example event may be communication of a specific packet over the network. Another example event may be identification of an application that is communicating over a network. These and other events may be used to determine that a particular endpoint includes or does not include actively updated security software from a trusted vendor.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility 122. Observations or inferences about events may also be logged by the event logging facility 166.

When a threat or other policy violation is detected by the security management facility 122, the remedial action facility 128 may be used to remediate the threat. Remedial action may take a variety of forms, including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions.

In some implementations, the remedial action facility 128 may implement commands to be directed to endpoints to increase or elevate security measures on endpoints. In some implementations, the remedial action facility 128 may direct affected endpoints to being, continue, and/or conclude a remediation process. In some implementations, the remedial action facility 128 may ascertain whether active security threats have been remediated such that elevated security measures may be relaxed.

More generally, the remedial action facility 128 may take any steps or deploy any measures suitable for addressing a detection of a threat, potential threat, policy violation or other event, code or activity that might compromise security of a computing instance 10-26 or the enterprise facility 102.

FIG. 2 depicts a diagram of a threat management system 201 such as any of the threat management systems described herein, and additionally including a cloud enterprise facility 280. Generally, systems 101 and 201 are similar; therefore, superfluous description of like elements is omitted herein for the sake of brevity and clarity of disclosure.

The cloud enterprise facility 280 of system 201 may include servers 284, 286, and a firewall 282. The servers 284, 286 on the cloud enterprise facility 280 may run one or more enterprise applications and make them available to the compute instances 10-26 of enterprise facility 102. It should be understood that there may be any number of servers 284, 286 and firewalls 282, as well as other compute instances in a given cloud enterprise facility 280. It also should be understood that a given enterprise facility may use either or both of SaaS applications 156 and cloud enterprise facilities 280, or, for example, a SaaS application 156 may be deployed on a cloud enterprise facility 280. As such, the configurations in FIG. 1 and FIG. 2 are shown by way of examples and not exclusive alternatives.

FIG. 3 shows a system 300 for enterprise network threat detection. System 300 may include one or more endpoints, e.g., endpoint 302; a threat management facility 308 (e.g., similar to facility 100 of FIG. 1 and FIG. 2); a modeling and analysis platform 318; and one or more third party services 320 (hosted on third party computing devices, all coupled via network 330. The system 300 may use any of the various tools and techniques for threat management described herein.

Endpoints such as the endpoint 302 may log events in a data recorder 304, e.g., a database or other storage. A local agent on the endpoint 302 such as the security agent 306 may filter this data and feed a filtered data stream to a threat management facility 308 such as a central threat management facility or any of the other threat management facilities described herein.

The threat management facility 308 can locally or globally tune filtering by local agents based on the current data stream, and can query local event data recorders for additional information where necessary or helpful in threat detection or forensic analysis. The threat management facility 308 may also (or alternatively) store and deploy a number of security tools such as a web-based user interface that is supported by machine learning models to aid in the identification and assessment of potential threats by a human user. This may, for example, include machine learning analysis of new network traffic, models to provide human-readable context for evaluating potential threats, and any of the other tools or techniques described herein. More generally, the threat management facility 308 may include one or more of a variety of threat management tools 316 to aid in the detection, evaluation, and remediation of threats or potential threats.

The threat management facility 308 may perform a range of threat management functions such as any of those described herein. In some implementations, the threat management facility 308 may provide an application programming interface 310 for third party services 320 from trusted security vendors, a user interface 312 for access to threat management and network administration functions, and one or more threat detection tools 314.

In general, the application programming interface 310 may support programmatic connections with third party services 320 that facilitate exchange of data between threat management facility 308 and third party services 320. The application programming interface 310 may, for example, connect to Active Directory or other customer information about files, data storage, identities and user profiles, roles, access privileges and so forth. More generally the application programming interface 310 may provide a programmatic interface for customer or other third party context, information, administration and security tools, and so forth. The application programming interface 310 may also or instead provide a programmatic interface for hosted applications, identity provider integration tools or services, and so forth.

The user interface 312 may include a website or other graphical interface or the like, and may generally provide an interface for user interaction with the threat management facility 308, e.g., for threat detection, network administration, audit, configuration and so forth. This user interface 312 may generally facilitate curation of potential threats, e.g., by presenting threats along with other supplemental information, and providing controls for a user to dispose of such threats as desired, e.g., by permitting execution or access, by denying execution or access, or by engaging in remedial measures such as sandboxing, quarantining, vaccinating, and so forth.

The threat detection tools 314 may include any of the threat detection tools, algorithms, or techniques described herein, or any other tools for detecting threats or potential threats within an enterprise network. This may, for example, include network behavioral tools, machine learning models, and so forth. In general, the threat detection tools 314 may use network traffic data caused by endpoints within the enterprise network, as well as any other available context such as heartbeats, to detect malicious software or potentially unsafe conditions for a network or endpoints connected to the network. In one aspect, the threat detection tools 314 may use network activity data from a number of endpoints (including, e.g., network components such as gateways, routers and firewalls) for improved threat detection in the context of complex or distributed threats. The threat detection tools 314 may also or instead include tools for reporting to a separate modeling and analysis platform 318, e.g., to support further investigation of security issues, creation or refinement of threat detection models or algorithms, review, and analysis of security breaches and so forth.

The threat management tools 316 may generally be used to manage or remediate threats to the enterprise network that have been identified with the threat detection tools 314 or otherwise. Threat management tools 316 may, for example, include tools for sandboxing, quarantining, removing, or otherwise remediating or managing malicious code or malicious activity, e.g., using any of the techniques described herein.

The endpoint 302 may be any of the endpoints or other compute instances described herein. This may, for example, include end-user computing devices, mobile devices, firewalls, gateways, servers, routers, and any other computing devices or instances that might connect to an enterprise network. As described above, the endpoint 302 may generally include a security agent 306 that locally supports threat management on the endpoint 302, such as by monitoring for malicious activity, managing security components on the endpoint 302, maintaining policy compliance, and communicating with the threat management facility 308 to support integrated security protection as contemplated herein. The security agent 306 may, for example, coordinate instrumentation of the endpoint 302 to detect various event types involving various computing objects on the endpoint 302, and supervise logging of events in a data recorder 304. The security agent 306 may also or instead scan computing objects such as electronic communications or files, monitor behavior of computing objects such as executables, and so forth. The security agent 306 may, for example, apply signature-based or behavioral threat detection techniques, machine learning models (e.g. models developed by the modeling and analysis platform), or any other tools or the like suitable for detecting malware or potential malware on the endpoint 302.

The data recorder 304 may log events occurring on or related to the endpoint. This may, for example, include events associated with computing objects on the endpoint 302 such as file manipulations, software installations, and so forth. This may also or instead include activities directed from the endpoint 302, such as requests for content from Uniform Resource Locators or other network activity involving remote resources. The data recorder 304 may record data at any frequency and any level of granularity consistent with proper operation of the endpoint 302 in an intended or desired manner.

The endpoint 302 may include a filter 322 to manage a flow of information from the data recorder 304 to a remote resource such as the threat detection tools 314 of the threat management facility 308. In this manner, a detailed log of events may be maintained locally on each endpoint, while network resources can be conserved for reporting of a filtered event stream that contains information believed to be most relevant to threat detection. The filter 322 may also or instead be configured to report causal information that causally relates collections of events to one another. In general, the filter 322 may be configurable so that, for example, the threat management facility 308 can increase or decrease the level of reporting based on a current security status of the endpoint, a group of endpoints, the enterprise network and the like. The level of reporting may also or instead be based on currently available network and computing resources, or any other appropriate context.

In another aspect, the endpoint 302 may include a query interface 324 so that remote resources such as the threat management facility 308 can query the data recorder 304 for additional information. This may include a request for specific events, activity for specific computing objects, or events over a specific time frame, or some combination of these. Thus for example, the threat management facility 308 may request all changes to the registry of system information for the past forty eight hours, all files opened by system processes in the past day, all network connections or network communications within the past hour, or any other parameterized request for activities monitored by the data recorder 304. In another aspect, the entire data log, or the entire log over some predetermined window of time, may be requested for further analysis at a remote resource.

It will be appreciated that communications among third party services 320, a threat management facility 308, and one or more endpoints such as the endpoint 302 may be facilitated by using consistent naming conventions across products and machines. For example, the system 300 may usefully implement globally unique device identifiers, user identifiers, application identifiers, data identifiers, Uniform Resource Locators, network flows, and files. The system may also or instead use tuples to uniquely identify communications or network connections based on, e.g., source and destination addresses and so forth.

According to the foregoing, a system disclosed herein includes an enterprise network, and endpoint coupled to the enterprise network, and a threat management facility coupled in a communicating relationship with the endpoint and a plurality of other endpoints through the enterprise network. The endpoint may have a data recorder that stores an event stream of event data for computing objects, a filter for creating a filtered event stream with a subset of event data from the event stream, and a query interface for receiving queries to the data recorder from a remote resource, the endpoint further including a local security agent configured to detect malware on the endpoint based on event data stored by the data recorder, and further configured to communicate the filtered event stream over the enterprise network. Additionally, the threat management facility can effectuate remediation of endpoints when suspicious activity is detected, elevate security measures on endpoints when indications of security threats are identified, and/or provide context for network-level elevated security measures when indications of security threats are identified.

Figure 4:
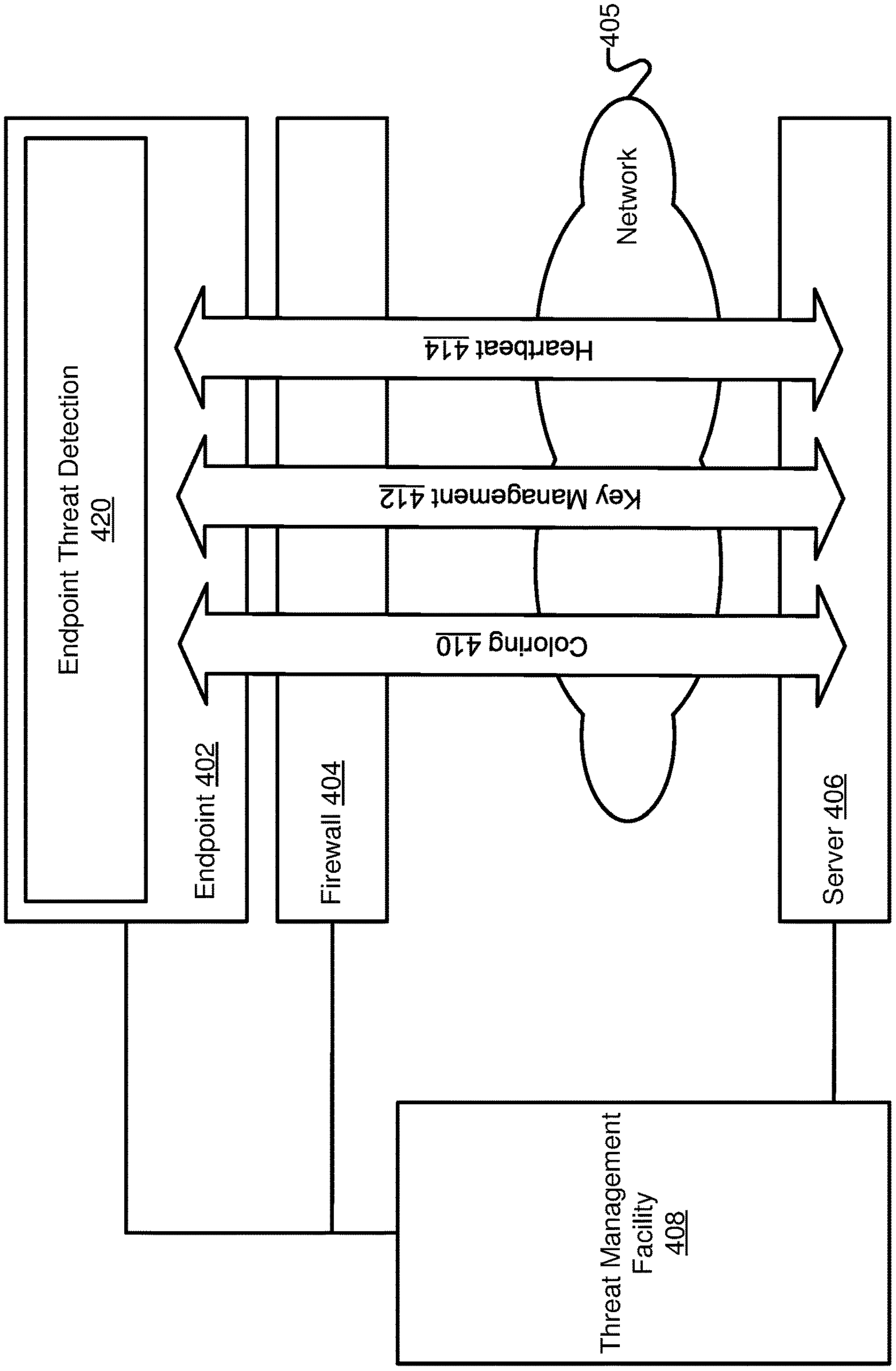
FIG. 4 is a block diagram of an example enterprise network threat management system, in accordance with some implementations.

FIG. 4 is a block diagram of an enterprise network threat management system. In general, the system may include an endpoint 402, a firewall 404, a server 406, and a threat management facility 408 coupled to one another directly or indirectly through a data network 405, as described above. Each of the entities depicted in FIG. 4 may, for example, be implemented on one or more computing devices such as the computing device described herein. A number of systems may be distributed across these various components to support threat detection, such as a coloring system 410, a key management system 412, and a heartbeat system 414, each of which may include software components executing on any of the foregoing system components, and each of which may communicate with the threat management facility 408 and an endpoint threat detection agent 420 executing on the endpoint 402 to support improved threat detection and remediation.

The coloring system 410 may be used to label or color software objects for improved tracking and detection of potentially harmful activity. The coloring system 410 may, for example, label files, executables, processes, network communications, data sources and so forth with any suitable information.

The key management system 412 may support management of keys for the endpoint 402 in order to selectively permit or prevent access to content on the endpoint 402 on a file-specific basis, a process-specific basis, an application-specific basis, a user-specific basis, or any other suitable basis in order to prevent data leakage, and in order to support more fine-grained and immediate control over access to content on the endpoint 402 when a security compromise is detected.

The heartbeat system 414 may be used to provide periodic or aperiodic information from the endpoint 402 or other system components about system health, security, status, and so forth. A heartbeat may be encrypted or plaintext, or some combination of these, and may be communicated unidirectionally (e.g., from the endpoint 408 to the threat management facility 408) or bidirectionally (e.g., between the endpoint 402 and the server 406, or any other pair of system components) on any useful schedule.

In general, these monitoring and management systems may cooperate to provide improved threat detection and response. For example, the coloring system 410 may be used to evaluate when a particular process is potentially opening inappropriate files based on an inconsistency or mismatch in colors, and a potential threat may be confirmed based on an interrupted heartbeat from the heartbeat system 414. The key management system 412 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 5:
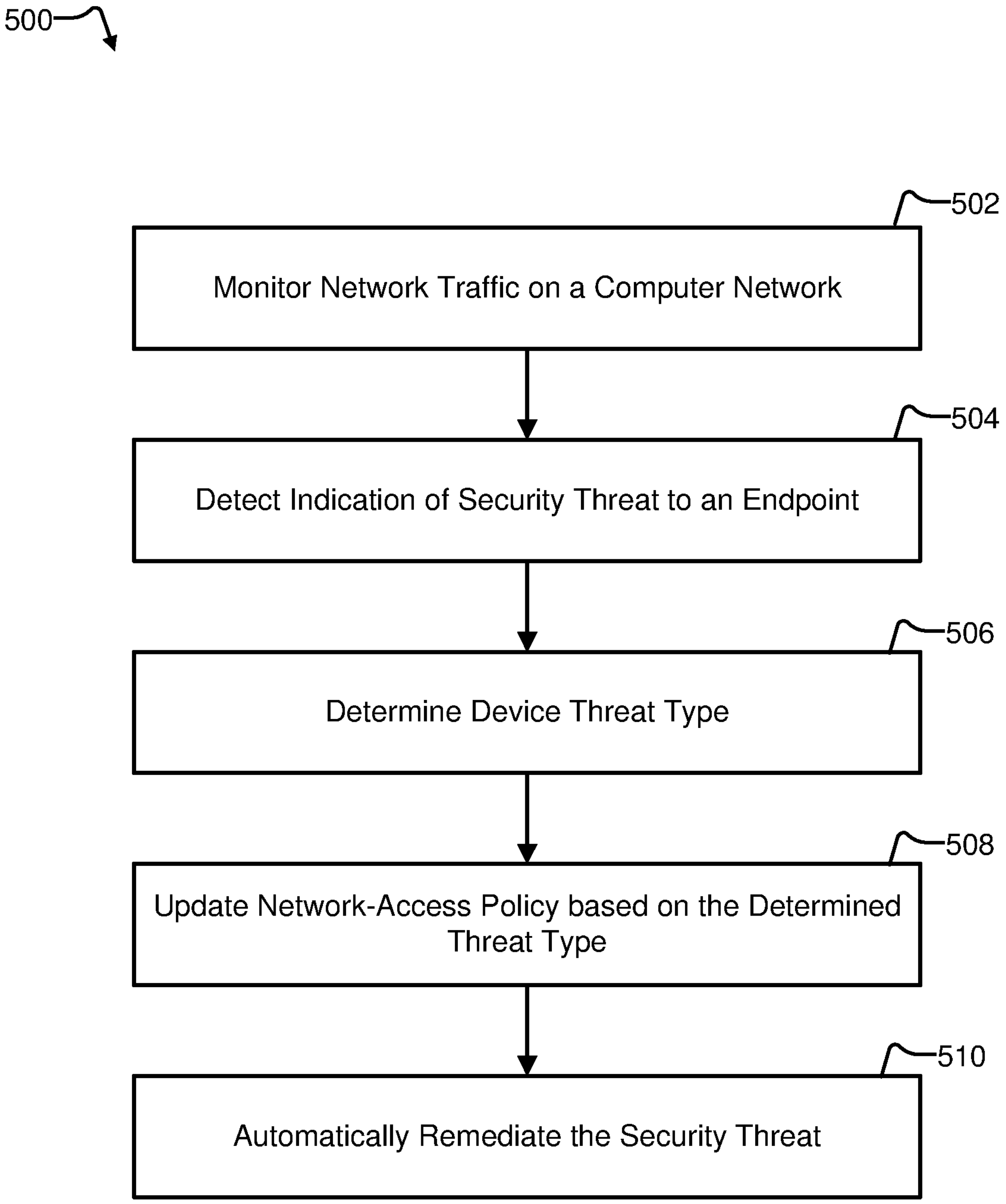
FIG. 5 is a flow diagram of an example method to mitigate computer network threats, in accordance with some implementations.

FIG. 5 shows a flow chart of an example method 500 to detect enterprise network threats. In general, various detection techniques are used to identify potential threats. For example, machine learning techniques may be used to evaluate suspiciousness based on network activity or a lack thereof during security update processes for managed endpoints. By filtering and prioritizing threats with these tools, automated threat mitigation actions can be performed and/or human threat intervention can advantageously be directed toward contexts most appropriate for non-automated responses.

FIG. 5 is a flow diagram of an example method 500 to mitigate computer network threats, in accordance with some implementations. In some implementations, method 500 can be implemented, for example, at a threat management facility such as facilities 100, 308, and 408 described with reference to FIGS. 1-4. In some implementations, method 500 can be implemented, for example, on server 406 described with reference to FIG. 4. In some implementations, method 500 can be implemented by a network monitor such as network monitor 432, or on an endpoint agent, such as security agent S of FIGS. 1-2. In some implementations, some or all of the method 500 can be implemented on one or more client devices, or on one or more server device(s), and/or on a combination of server device(s) and client device(s). In described examples, the implementing system includes one or more digital processors or processing circuitry ("processors"), and one or more storage devices (e.g., a data store 304, data lake 427, or other storage). In some implementations, different components of one or more servers and/or clients can perform different blocks or other parts of the method 500. In some examples, a first device is described as performing blocks of method 500. Some implementations can have one or more blocks of method 500 performed by one or more other devices (e.g., other client devices or server devices) that can send results or data to the first device.

In some implementations, the method 500, or portions of the method, can be initiated automatically by a system. In some implementations, the implementing system is a first device. For example, the method (or portions thereof) can be periodically performed, or performed based on one or more particular events or conditions, e.g., a number of potential threats being above a threshold, new patterns of network activity becoming available to a threat management facility, and/or one or more other conditions occurring which can be specified in settings read by the method.

In general, a firewall or network monitor (e.g., such as threat management facility 100 or network monitor 432) can receive process information from an endpoint (e.g., endpoint 12, 22, etc.) to associate network traffic with a security threat on the endpoint, which is the source of the network traffic. The firewall or network monitor also may be notified about indications of security threats issued by security monitors on an endpoint, or on other endpoints.

In general, various detection techniques are used to identify potential threats. For example, machine learning techniques may be used to evaluate suspiciousness based on activity related to a monitored endpoint. Additionally, any of the threat management facilities and sub-components may monitor endpoints for potential indications of security threats. Furthermore, other endpoints may provide indications of security threats to adjacent endpoints or endpoints on a particular sub-portion of a computer network. Based upon outputs of these tools, a policy management facility (e.g., such as facility 112) may update a network-access policy such that network-level elevated security measures are implemented. By updating the network-access policy and pushing the same to endpoints on the network, automated threat mitigation actions can be performed and/or human threat intervention can advantageously be directed toward contexts most appropriate for a particular threat indication, while allowing a sub-portion of functions on the affected endpoint to continue. It is noted that as the updated network-access policy may be tailored to limit or reduce lateral movement of malicious code, the affected endpoint may be remediated with a reduction in disruption to the computer network.

Method 500 may begin at block 502. At block 502, network activity on a computer network may be monitored. The computer network may include a plurality of endpoints. Furthermore, the network traffic for each endpoint can include data indicative of computer-executable code executing on each endpoint. In this manner, a security agent or other process may identify indications of security threats based on indications of code that results in network activity, disk activity, resource allocation requests, and others. Furthermore, endpoints may transmit indications of security threats based on self-scanning, remote scanning, and others, and transmit the indications over the network as network traffic. Block 502 may be followed by block 506.

At block 504, an indication of security threat may be received for one or more endpoints on the network. Activity for the endpoints may be monitored, e.g., using self-reporting by the devices and associated data recorders and/or security agents deployed thereon, such that robust logs of activity are obtained which may be used to train a security status detection model. In addition, network activity may be obtained by monitoring the network on which the devices are deployed, for example, by a firewall, gateway, or other network monitor. Active or potential security threats may be indicated through analysis of the associated activity. In this manner, the indication of security threat may be received from security software that executes on the user device.

Alternatively, in some implementations, the indication of security threat may be received from a remote device in communication with the endpoint, and the security threat is suspicious or malicious activity on the endpoint that is identified by the remote device. Thus, the indications of security threats may originate from the endpoint, from a remote device in operative communication with the endpoint, from a remote or centralized threat management facility, or any combination thereof.

In some implementations, the indication of security threat is associated with a device threat type. The method 500 continues at block 506.

At block 506, a type of threat is determined based on the indication of security threat. For example, the device threat type associated with the indication of security threat may be determined to be one or more different threat types. In general, threat types may be dynamically categorized, based on data related to emerging, known, and unknown threats to computer networks. For example, threat types may be categorized dynamically based on data provided by a threat analysis third party service provider, and/or any other connected service illustrated and described above with reference to FIG. 1 and FIG. 2. In addition, coloring system 410, key management system 412, and/or heartbeat system 414 may provide data on malicious activity that may inform categorization of threat types.

Based on a threat type category, inferences as to a severity of a threat may be made. Threat type categories may include at least: no immediate action required type, and, immediate action required type. In general, threat types of an "immediate action required" type may indicate that increased security measures are appropriate. Other threat type categories including sub-categories may also be applicable. The method 500 continues at block 508.

At block 508, a network-access policy for the plurality of endpoints on the computer network is updated with the determined threat type. For example, the updating can include establishing a new rule or an updated rule to limit communication between the affected endpoint and other endpoints on the computer network. The updated network-access policy may be tailored to limit or mitigate lateral movement of malicious code from the affected endpoint to other endpoints, while allowing some functions of the affected endpoint to continue.

For example, in some implementations, the updated network-access policy may be tailored to provide device isolation and/or partial device isolation. For example, device isolation may include preventing a device from accessing a network. Some devices such as administrator devices or servers (e.g., enterprise servers or update servers) may not be a part of some network-access policies. For example, partial device isolation may include a subset of device isolation policies where particular area of a local network may remain accessible, while other parts of a network are inaccessible based on the network-access policy.

For example, in some implementations, the updated network-access policy may be tailored to provide reputation assisted isolation. Reputation assisted isolation may include preventing access to a network except for when a device exceeds a threshold device reputation.

For example, in some implementations, the updated network-access policy may be tailored to provide application protocol filtering. Application protocol filtering may include only permitting certain network protocols to and/or from a device, such as, for example, blocking file sharing applications or other network protocols.

For example, in some implementations, the updated network-access policy may be tailored to provide other inspection driven mitigation methods and measures to restrict permitted network traffic. These and other examples of network-access policy updates will be apparent from review of this disclosure.

The method 500 continues at block 510.

At block 510, the security threat on the affected endpoint may be automatically remediated within a first time period. Generally, the first time period is a time period that is defined based on a particular implementation. In some implementations, the time period is about 24-hours. In some implementations, the time period is 24, 48, or 72 hours. In some implementations, the time period is a dynamic period based on a severity of a threat, a device threat type, and/or other considerations.

The automatic remediation can be effectuated by a security agent or software executing on the endpoint, or remote security software. For example, a security agent on the affected endpoint may be directed to remediate the threat causing the indication of security threat on the endpoint.

In some implementations, a remote device may direct security software (or the security agent) on the affected endpoint to initiate the remediation process. The remote device may monitor progress of the remediation, cause updates to a security status of the endpoint based on the remediation, and so on. Upon remediation of the security threat, or upon expiration of the first time period, the network-level elevated security measures (e.g., the updated network-access policy) may be reversed and/or relaxed.

As described above, a system for computer assisted remediation of security threats may include a memory storing a security software configured to evaluate the security status of an endpoint based on a plurality of threat factors. The system may also include a threat management facility configured to apply a security status detection model to identify emerging security threats. The system may also include a policy management facility to provide updated network-access policies to limit or mitigate lateral movement of malicious code during remediation. Other variations and additions are also applicable.

Hereinafter, a particular implementation with particular devices performing functions described above, is described with reference to FIG. 6.

Figure 6:
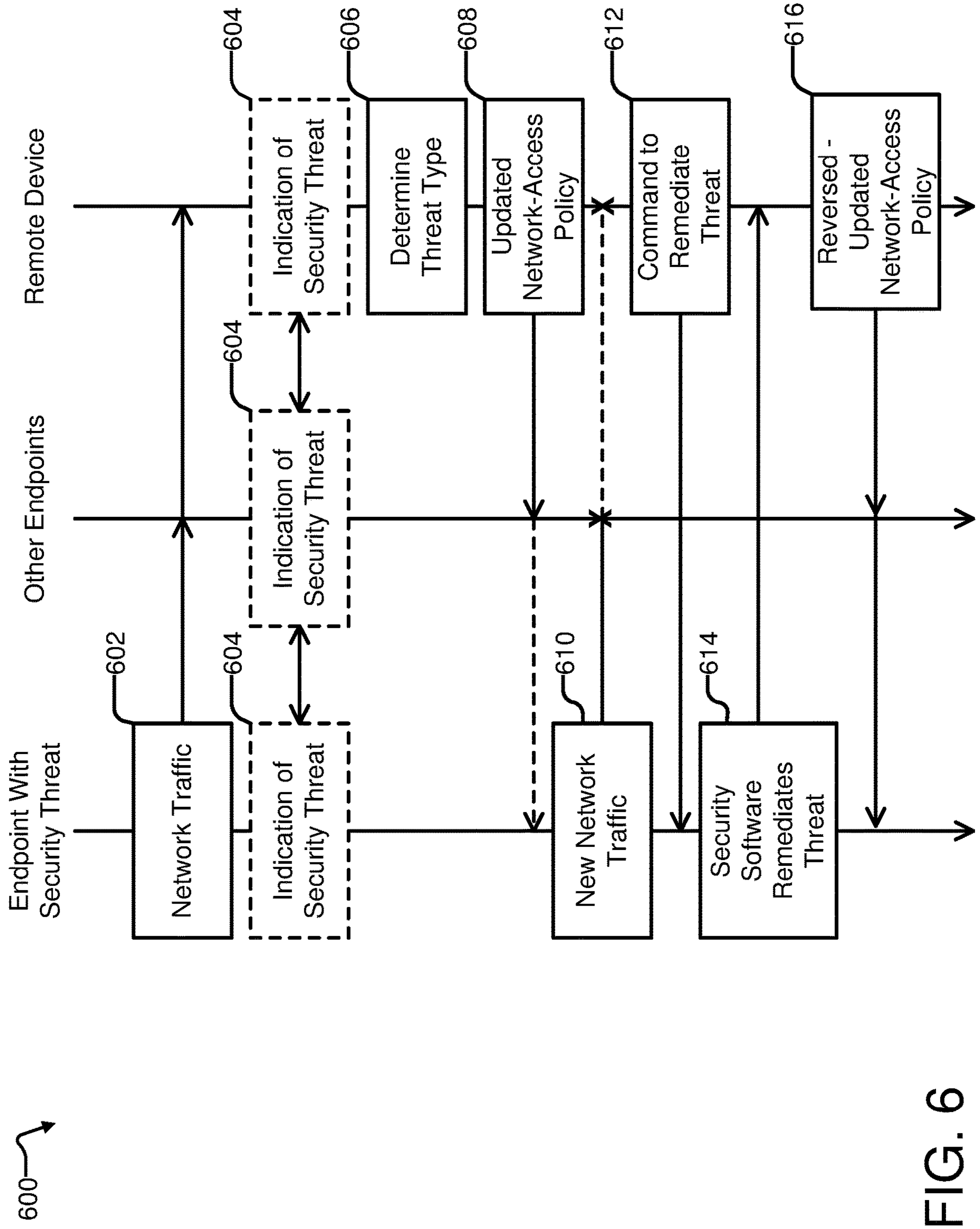
FIG. 6 is a swim lane diagram of an example method to mitigate computer network threats, in accordance with some implementations.

FIG. 6 is a swim lane diagram of an example method 600 to mitigate computer network threats, in accordance with some implementations. As illustrated, an affected endpoint may transmit network traffic (block 602) to other endpoints and/or a remote device, all in communication via a network.

Thereafter, an indication of security threat (block 604) may be communicated from the affected endpoint, from other endpoints, and/or from the remote device. The indication of security threat may be transmitted by all noted entities in some implementations. In some implementations, the indication of security threat is provided by one or more entities.

Responsive to the receipt of the indication of security threat, the remote device may determine a threat type (block 606). For example, threat types may be determined as described above with reference to FIG. 5.

Upon determining the threat type, the remote device may update a network-access policy and direct a policy management facility to push the updated network-access policy to the other endpoints and/or the affected endpoint (block 608). In some implementations, the policy management facility 212 conducts all policy updates based on data received from the remote device (e.g., a device and/or endpoint ID of the affected endpoint, threat type, etc.). Other variations are also applicable.

As illustrated, upon updating and transmitting the updated network-access policy, new network traffic (block 610) is blocked from being received at the other endpoints and/or the remote device. It is noted that some network traffic may be received at the remote device to effectuate monitoring and other security activities.

The remote device may also issue a command to the affected endpoint to remediate the security threat (block 612). The command may be directly transmitted and/or relayed to the affected endpoint, and may be received by a security agent executing on the affected endpoint.

Upon receipt of the command, or subsequent to receipt of the command, the affected endpoint may attempt to automatically remediate the threat using security software executing thereon (block 614). Results of the remediation attempt may be transmitted to the remote device for confirmation.

Upon determining that the security threat has been remediated, that the security threat no longer exists, and/or that the security threat type is a type not requiring elevated security measures, the updated network-access policy may be reversed, relaxed, or otherwise updated (block 616).

Variations upon the method flow of method 600 may be apparent to those of ordinary skill in the art, and all such variations are intended to be included within the scope of the above-description.

As described above, network-level elevated security measures may be implemented based on indications of security threats received for particular endpoints. In addition, elevated security measures may be implemented on affected devices, endpoints, and others, as described below with reference to FIG. 7.

Figure 7:
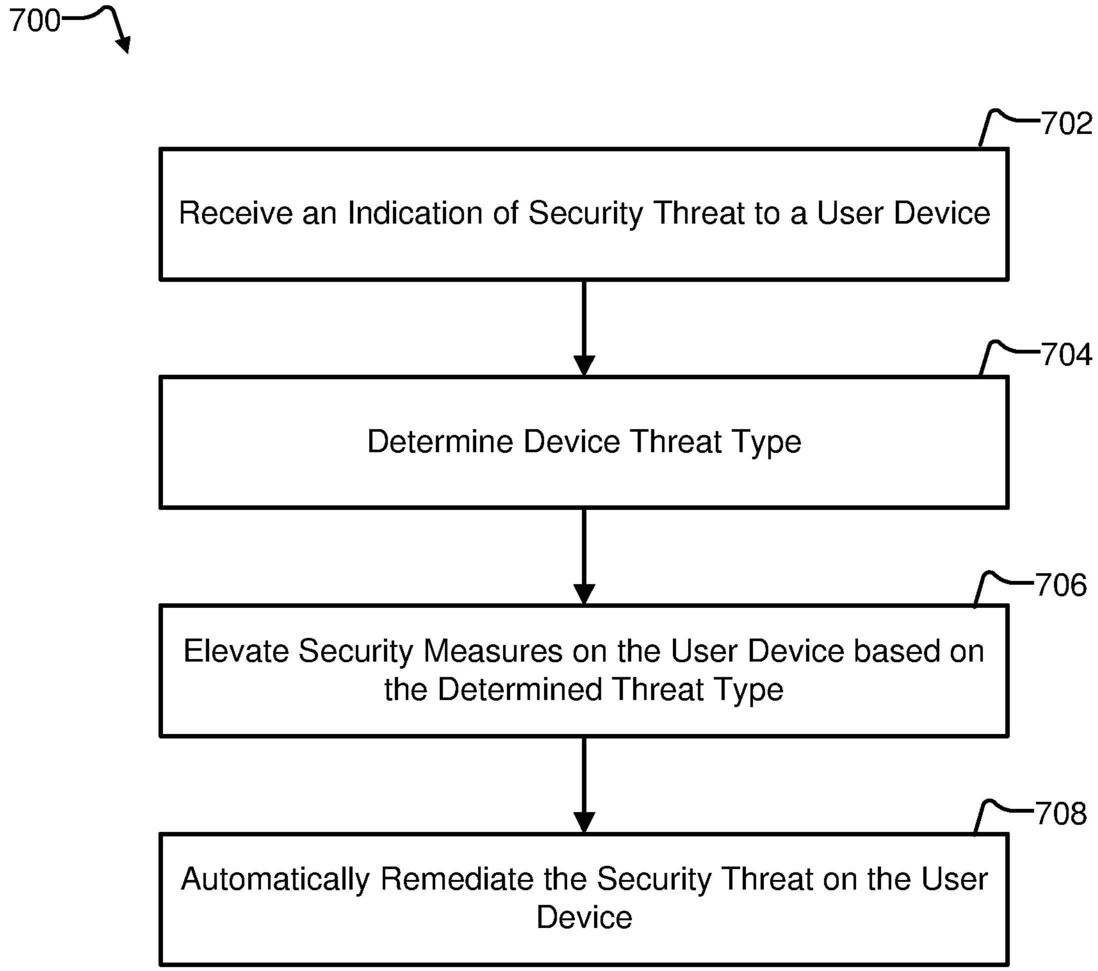
FIG. 7 is a flow diagram of an example method to mitigate user device security threats, in accordance with some implementations.

FIG. 7 is a flow diagram of an example method 700 to mitigate user device security threats, in accordance with some implementations. In some implementations, method 700 can be implemented, for example, at a threat management facility such as facilities 100, 308, and 408 described with reference to FIGS. 1-4. In some implementations, method 700 can be implemented, for example, on server 406 described with reference to FIG. 4. In some implementations, method 700 can be implemented by a network monitor such as network monitor 432, or on an endpoint agent, such as security agent S of FIGS. 1-2. In some implementations, some or all of the method 700 can be implemented on one or more client devices, or on one or more server device(s), and/or on a combination of server device(s) and client device(s). In described examples, the implementing system includes one or more digital processors or processing circuitry ("processors"), and one or more storage devices (e.g., a data store 304, data lake 427, or other storage). In some implementations, different components of one or more servers and/or clients can perform different blocks or other parts of the method 700. In some examples, a first device is described as performing blocks of method 700. Some implementations can have one or more blocks of method 700 performed by one or more other devices (e.g., other client devices or server devices) that can send results or data to the first device.

In some implementations, the method 700, or portions of the method, can be initiated automatically by a system. In some implementations, the implementing system is a first device. For example, the method (or portions thereof) can be periodically performed, or performed based on one or more particular events or conditions, e.g., a number of potential threats being above a threshold, new patterns of network activity becoming available to a threat management facility, and/or one or more other conditions occurring which can be specified in settings read by the method.

In general, a firewall or network monitor (e.g., such as threat management facility 100 or network monitor 432) can receive process information from an endpoint (e.g., endpoint 12, 22, etc.) to identify a security threat on the endpoint. The firewall or network monitor also may be notified about indications of security threats issued by security monitors on an endpoint, or on other endpoints.

In general, various detection techniques are used to identify potential threats. For example, machine learning techniques may be used to evaluate suspiciousness based on activity related to a monitored endpoint. Additionally, any of the threat management facilities and sub-components may monitor endpoints for potential indications of security threats. Furthermore, other endpoints may provide indications of security threats to adjacent endpoints or endpoints on a particular sub-portion of a computer network. Based upon outputs of these tools, a remote device or security agent on the affected endpoint may elevate security measures on the device. By elevating security measures on the endpoint, automated threat mitigation actions can be performed and/or human threat intervention can advantageously be directed toward contexts most appropriate for a particular threat indication, while allowing a sub-portion of functions on the affected endpoint to continue. It is noted that as the elevated security measures may still allow the endpoint to process some functions, the affected endpoint may be remediated with a reduction in disruption to the computer network. The method 700 may commence at block 702.

At block 702, an indication of security threat may be received for one or more user devices on the network. Activity for the user devices may be monitored, e.g., using self-reporting by the devices and associated data recorders and/or security agents deployed thereon, such that robust logs of activity are obtained which may be used to train a security status detection model. In addition, network activity may be obtained by monitoring the network on which the devices are deployed, for example, by a firewall, gateway, or other network monitor. Active or potential security threats may be indicated through analysis of the associated activity. In this manner, the indication of security threat may be received from security software that executes on the user device.

Alternatively, in some implementations, the indication of security threat may be received from a remote device in communication with the user device, and the security threat is suspicious or malicious activity on the user device that is identified by the remote device. Thus, the indications of security threats may originate from the user device, from a remote device in operative communication with the user device, from a remote or centralized threat management facility, or any combination thereof.

In some implementations, the indication of security threat is associated with a device threat type. The method 700 continues at block 704.

At block 704, a type of threat is determined based on the indication of security threat. For example, the device threat type associated with the indication of security threat may be determined to be one or more different threat types. In general, threat types may be dynamically categorized, based on data related to emerging, known, and unknown threats to computer networks. For example, threat types may be categorized dynamically based on data provided by a threat analysis third party service provider, and/or any other connected service illustrated and described above with reference to FIG. 1 and FIG. 2. In addition, coloring system 410, key management system 412, and/or heartbeat system 414 may provide data on malicious activity that may inform categorization of threat types.

Based on a threat type category, inferences as to a severity of a threat may be made. Threat type categories may include at least: no immediate action required type, and, immediate action required type. In general, threat types of an "immediate action required" type may indicate that increased security measures are appropriate. Other threat type categories including sub-categories may also be applicable. The method 700 continues at block 706.

At block 706, security measures on the user device are elevated based on determined threat type. For example, the elevated security measures may include measures to limit network activity, limit account creation, limit disk access, limit resource usage, and others. The elevated security measures may be tailored to limit or mitigate lateral movement of malicious code from the affected user device to other devices, while allowing some functions of the affected user device to continue.

In some implementations, the elevated security measures include preventing network access from the user device. In some implementations, the elevated security measures include preventing execution of untrusted software on the user device. In some implementations, the elevated security measures include preventing creation of new user accounts on the user device. In some implementations, the elevated security measures include preventing creation of a service in a safe mode on the user device. In some implementations, the elevated security measures includes preventing a reboot of the user device into the safe mode. Other variations and implementations are also applicable.

In some implementations, the elevated security measures can also include preventing devices that are suspected to be compromised from connecting to remote network addresses. In some implementations, the elevated security measures can also include preventing devices that are suspected to be compromised from causing configuration changes to the operating system on the device (e.g., any changes, some changes that affect security posture, and others). In some implementations, the elevated security measures can also include preventing devices that are suspected of being compromised from engaging in any software behavior that includes attempts to bypass or impair security software products or portions thereof. In some implementations, the elevated security measures can also include preventing software executing on a device suspected of being compromised from accessing a device registry, particular files, particular process artifacts, and others that are related to credentials or sensitive data. Other variations are also applicable according to some implementations.

The method 700 continues at block 708.

At block 708, the security threat on the affected user device may be automatically remediated within a first time period. Generally, the first time period is a time period that is defined based on a particular implementation. In some implementations, the time period is about 24-hours. In some implementations, the time period is 24, 48, or 72 hours. In some implementations, the time period is a dynamic period based on a severity of a threat, a device threat type, and/or other considerations.

The automatic remediation can be effectuated by a security agent or software executing on the user device, or remote security software. For example, a security agent on the user device may be directed to remediate the threat causing the indication of security threat on the user device.

In some implementations, a remote device may direct security software (or the security agent) on the user device to initiate the remediation process. The remote device may monitor progress of the remediation, cause updates to a security status of the user device based on the remediation, and so on. Upon remediation of the security threat, or upon expiration of the first time period, the elevated security measures (e.g., on the user device) may be reversed and/or relaxed.

As described above, a system for computer assisted remediation of security threats may include a memory storing a security software configured to evaluate the security status of a user device based on a plurality of threat factors. The system may also include a threat management facility configured to apply a security status detection model to identify emerging security threats. The system may also include a remote device to directed a user device to elevate security measures in order to limit or mitigate lateral movement of malicious code during remediation. Other variations and additions are also applicable.

Hereinafter, a particular implementation with particular devices performing functions described above, is described with reference to FIG. 8.

Figure 8:
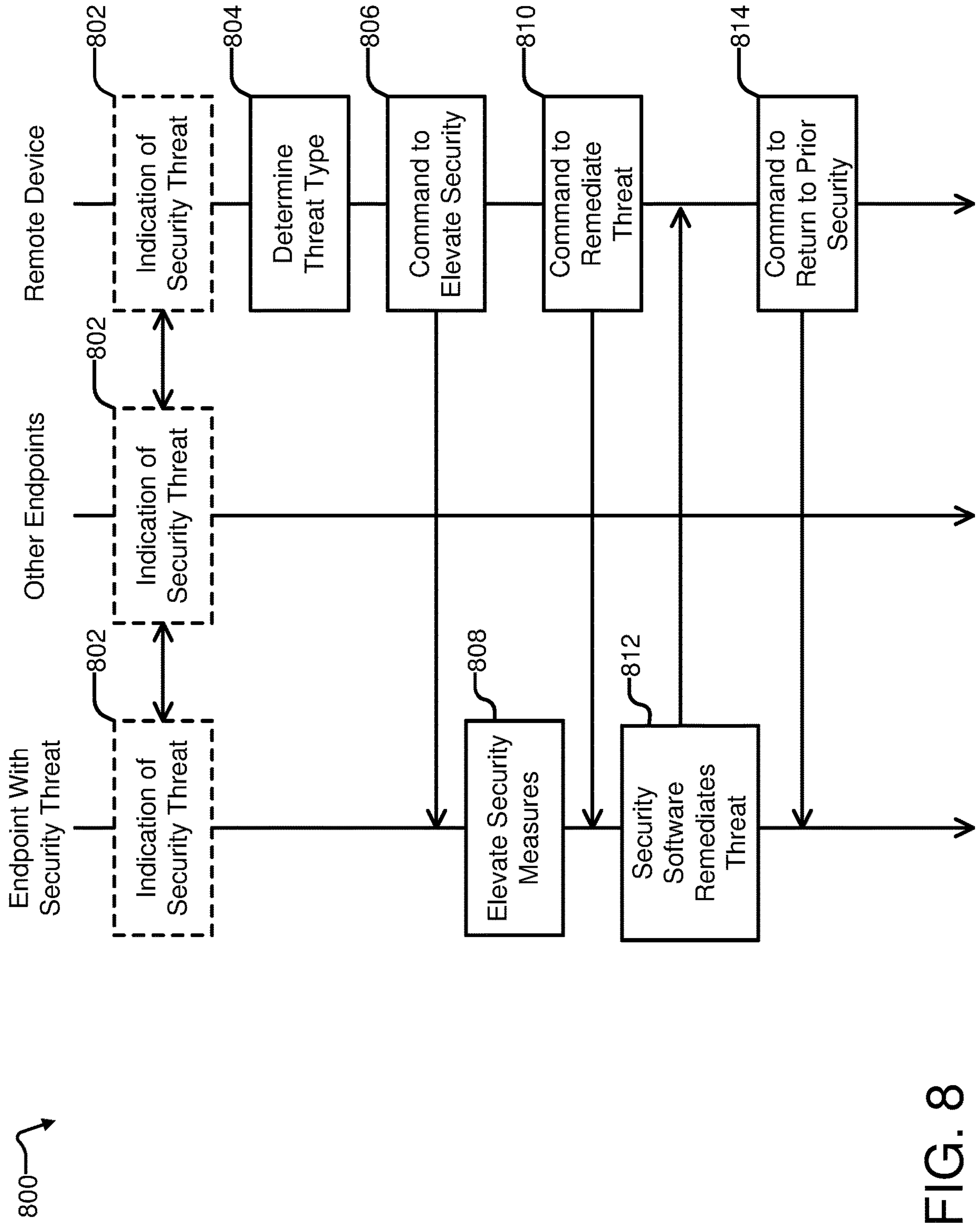
FIG. 8 is a swim lane diagram of an example method to mitigate user device security threats, in accordance with some implementations.

FIG. 8 is a swim lane diagram of an example method 800 to mitigate user device security threats, in accordance with some implementations. As illustrated, an indication of security threat (block 802) may be communicated from the affected endpoint, from other endpoints, and/or from the remote device. The indication of security threat may be transmitted by all noted entities in some implementations. In some implementations, the indication of security threat is provided by one or more entities.

Responsive to the receipt of the indication of security threat, the remote device may determine a threat type (block 804). For example, threat types may be determined as described above with reference to FIG. 5 and FIG. 7.

Upon determining the threat type, the remote device may issue a command to the affected endpoint to elevate security measure (block 806). Responsive to the command, the affected endpoint may elevate security measures (block 808). Examples of elevated security measures are listed above with reference to FIG. 7.

Upon determining the threat type and/or issuing the command to elevate security measures and/or at substantially the same time, the remote device may also issue a command to the affected endpoint to remediate the security threat (block 810). The commands may be directly transmitted and/or relayed to the affected endpoint, and may be received by a security agent executing on the affected endpoint.

Upon receipt of the command, or subsequent to receipt of the command, the affected endpoint may attempt to automatically remediate the threat using security software executing thereon (block 812). Results of the remediation attempt may be transmitted to the remote device for confirmation.

Upon determining that the security threat has been remediated, that the security threat no longer exists, and/or that the security threat type is a type not requiring elevated security measures, the elevated security measures may be reversed, relaxed, or otherwise updated (command block 814).

Variations upon the method flow of method 800 may be apparent to those of ordinary skill in the art, and all such variations are intended to be included within the scope of the above-description.

Figure 9:
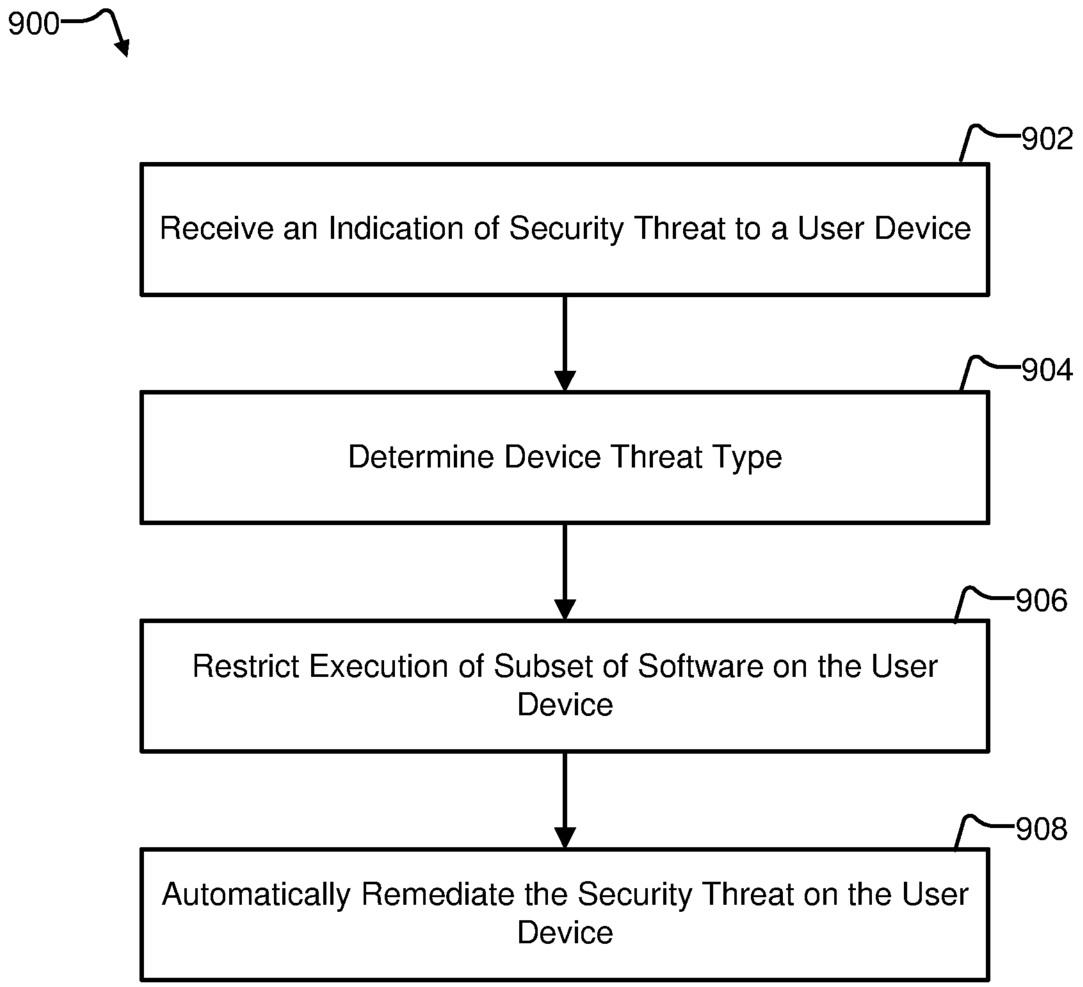
FIG. 9 is a flow diagram of an example method to mitigate user device security threats, in accordance with some implementations.

FIG. 9 is a flow diagram of an additional example method to mitigate user device security threats, in accordance with some implementations. In some implementations, method 900 can be implemented, for example, at a threat management facility such as facilities 100, 308, and 408 described with reference to FIGS. 1-4. In some implementations, method 900 can be implemented, for example, on server 406 described with reference to FIG. 4. In some implementations, method 900 can be implemented by a network monitor such as network monitor 432, or on an endpoint agent, such as security agent S of FIGS. 1-2. In some implementations, some or all of the method 900 can be implemented on one or more client devices, or on one or more server device(s), and/or on a combination of server device(s) and client device(s). In described examples, the implementing system includes one or more digital processors or processing circuitry ("processors"), and one or more storage devices (e.g., a data store 304, data lake 427, or other storage). In some implementations, different components of one or more servers and/or clients can perform different blocks or other parts of the method 900. In some examples, a first device is described as performing blocks of method 900. Some implementations can have one or more blocks of method 900 performed by one or more other devices (e.g., other client devices or server devices) that can send results or data to the first device.

In some implementations, the method 900, or portions of the method, can be initiated automatically by a system. In some implementations, the implementing system is a first device. For example, the method (or portions thereof) can be periodically performed, or performed based on one or more particular events or conditions, e.g., a number of potential threats being above a threshold, new patterns of network activity becoming available to a threat management facility, and/or one or more other conditions occurring which can be specified in settings read by the method.

In general, a firewall or network monitor (e.g., such as threat management facility 100 or network monitor 432) can receive process information from an endpoint (e.g., endpoint 12, 22, etc.) to identify a security threat on the endpoint. The firewall or network monitor also may be notified about indications of security threats issued by security monitors on an endpoint, or on other endpoints.

In general, various detection techniques are used to identify potential threats. For example, machine learning techniques may be used to evaluate suspiciousness based on activity related to a monitored endpoint. Additionally, any of the threat management facilities and sub-components may monitor endpoints for potential indications of security threats. Furthermore, other endpoints may provide indications of security threats to adjacent endpoints or endpoints on a particular sub-portion of a computer network. Based upon outputs of these tools, a remote device or security agent on the affected endpoint may elevate security measures on the device and/or restrict execution of one or more software applications and/or a subset of available software on the affected device. By restricting execution on the endpoint, automated threat mitigation actions can be performed and/or human threat intervention can advantageously be directed toward contexts most appropriate for a particular threat indication, while allowing a sub-portion of functions on the affected endpoint to continue. It is noted that as the elevated security measures and/or restricted execution of a subset of software may still allow the endpoint to process some functions, the affected endpoint may be remediated with a reduction in disruption to the computer network. The method 900 may commence at block 902.

At block 902, an indication of security threat may be received for one or more user devices on the network. Activity for the user devices may be monitored, e.g., using self-reporting by the devices and associated data recorders and/or security agents deployed thereon, such that robust logs of activity are obtained which may be used to train a security status detection model. In addition, network activity may be obtained by monitoring the network on which the devices are deployed, for example, by a firewall, gateway, or other network monitor. Active or potential security threats may be indicated through analysis of the associated activity. In this manner, the indication of security threat may be received from security software that executes on the user device.

Alternatively, in some implementations, the indication of security threat may be received from a remote device in communication with the user device, and the security threat is suspicious or malicious activity on the user device that is identified by the remote device. Thus, the indications of security threats may originate from the user device, from a remote device in operative communication with the user device, from a remote or centralized threat management facility, or any combination thereof.

In some implementations, the indication of security threat is associated with a device threat type. The method 900 continues at block 904.

At block 904, a type of threat is determined based on the indication of security threat. For example, the device threat type associated with the indication of security threat may be determined to be one or more different threat types. In general, threat types may be dynamically categorized, based on data related to emerging, known, and unknown threats to computer networks. For example, threat types may be categorized dynamically based on data provided by a threat analysis third party service provider, and/or any other connected service illustrated and described above with reference to FIG. 1 and FIG. 2. In addition, coloring system 410, key management system 412, and/or heartbeat system 414 may provide data on malicious activity that may inform categorization of threat types.

Based on a threat type category, inferences as to a severity of a threat may be made. Threat type categories may include at least: no immediate action required type, and, immediate action required type. In general, threat types of an "immediate action required" type may indicate that increased security measures are appropriate. Other threat type categories including sub-categories may also be applicable. The method 900 continues at block 906.

At block 906, software execution on the user device is restricted based on determined threat type and/or security measures on the affected device are elevated. For example, the elevated security measures may include measures to limit network activity, limit account creation, limit disk access, limit resource usage, and others. The elevated security measures may be tailored to limit or mitigate lateral movement of malicious code from the affected user device to other devices, while allowing some functions of the affected user device to continue.

In some implementations, the elevated security measures include preventing network access from the user device. In some implementations, the elevated security measures include preventing execution of untrusted software on the user device. In some implementations, the elevated security measures include preventing creation of new user accounts on the user device. In some implementations, the elevated security measures include preventing creation of a service in a safe mode on the user device. In some implementations, the elevated security measures includes preventing a reboot of the user device into the safe mode. Other variations and implementations are also applicable.

In some implementations, the elevated security measures can also include preventing devices that are suspected to be compromised from connecting to remote network addresses. In some implementations, the elevated security measures can also include preventing devices that are suspected to be compromised from causing configuration changes to the operating system on the device (e.g., any changes, some changes that affect security posture, and others). In some implementations, the elevated security measures can also include preventing devices that are suspected of being compromised from engaging in any software behavior that includes attempts to bypass or impair security software products or portions thereof. In some implementations, the elevated security measures can also include preventing software executing on a device suspected of being compromised from accessing a device registry, particular files, particular process artifacts, and others that are related to credentials or sensitive data. Other variations are also applicable according to some implementations.

In some implementations, the restricting includes restricting execution of a subset of software available on the user device for a first time period. Generally, the first time period is a time period that is defined based on a particular implementation. In some implementations, the time period is about 24-hours. In some implementations, the time period is 24, 48, or 72 hours. In some implementations, the time period is a dynamic period based on a severity of a threat, a device threat type, and/or other considerations.

In some implementations, the subset of software available on the user device comprises at least one software application installed on the user device. In these scenarios, restricting the execution can include restricting, for the at least one software application, one or more of: combinations of command-line parameters; network traffic; file modification; or downloads of specific file types.

In some implementations, the restricting can include restricting initialization of the at least one software application from one or more user accounts, restricting initialization of child processes for the at least one software application, restricting network traffic to only non-file transmissions, and others.

In some implementations, the subset of the software can include a shell application (e.g., such as a power shell, command-line shell, etc.). In these scenarios, restricting execution may include restricting one or more combinations of command-line parameters. These restrictions may provide benefits in disallowing certain activities, while allowing other processing functions to continue.

The method 900 continues at block 908.

At block 908, the security threat on the affected user device may be automatically remediated within the first time period. The automatic remediation can be effectuated by a security agent or software executing on the user device, or remote security software. For example, a security agent on the user device may be directed to remediate the threat causing the indication of security threat on the user device.

In some implementations, a remote device may direct security software (or the security agent) on the user device to initiate the remediation process. The remote device may monitor progress of the remediation, cause updates to a security status of the user device based on the remediation, and so on. Upon remediation of the security threat, or upon expiration of the first time period, the elevated security measures (e.g., on the user device) may be reversed and/or relaxed.

Figure 11:
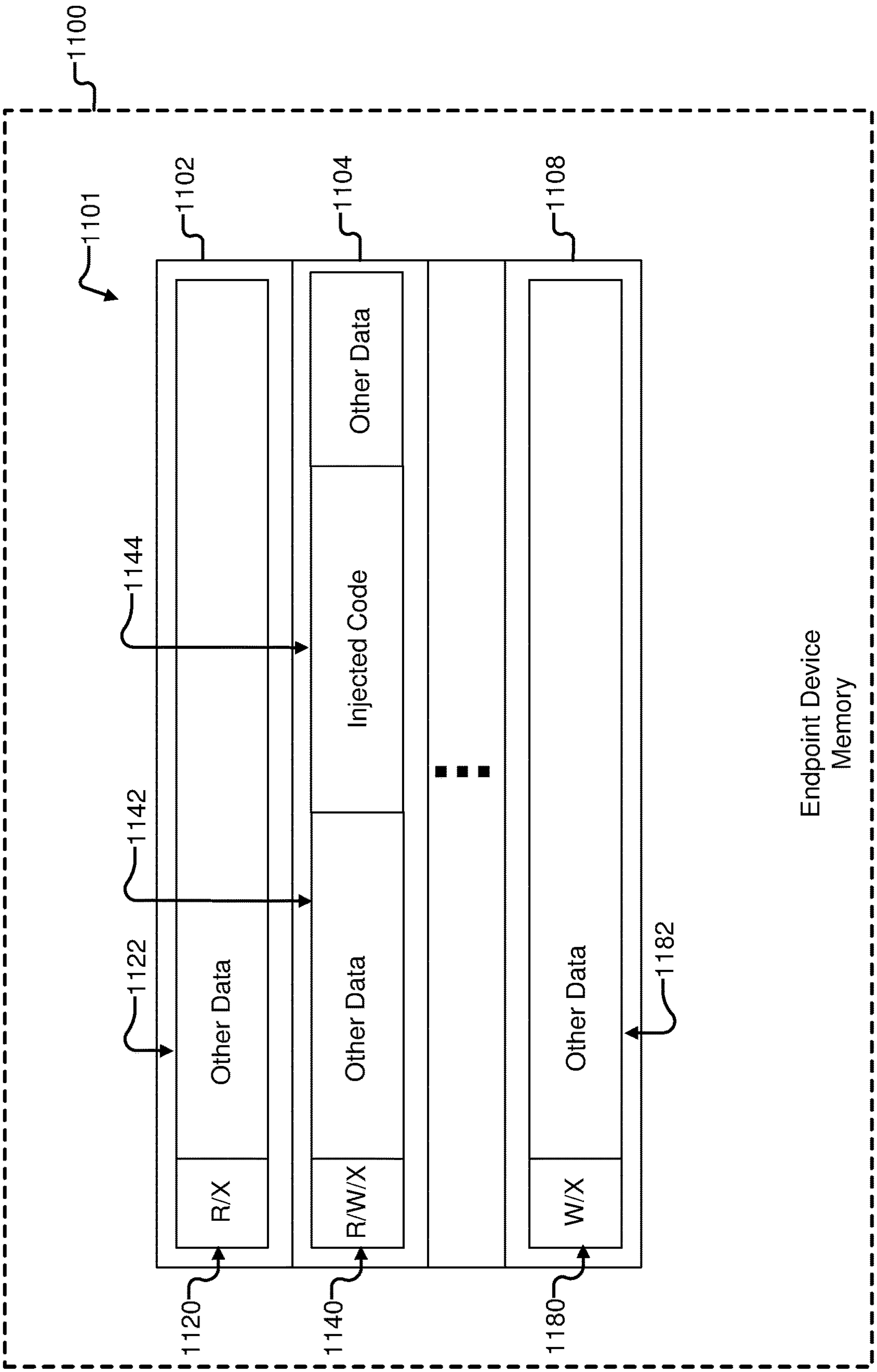
FIG. 11 is a schematic of an endpoint device memory with multiple processes stored thereon, in accordance with some implementations.
Figure 12:
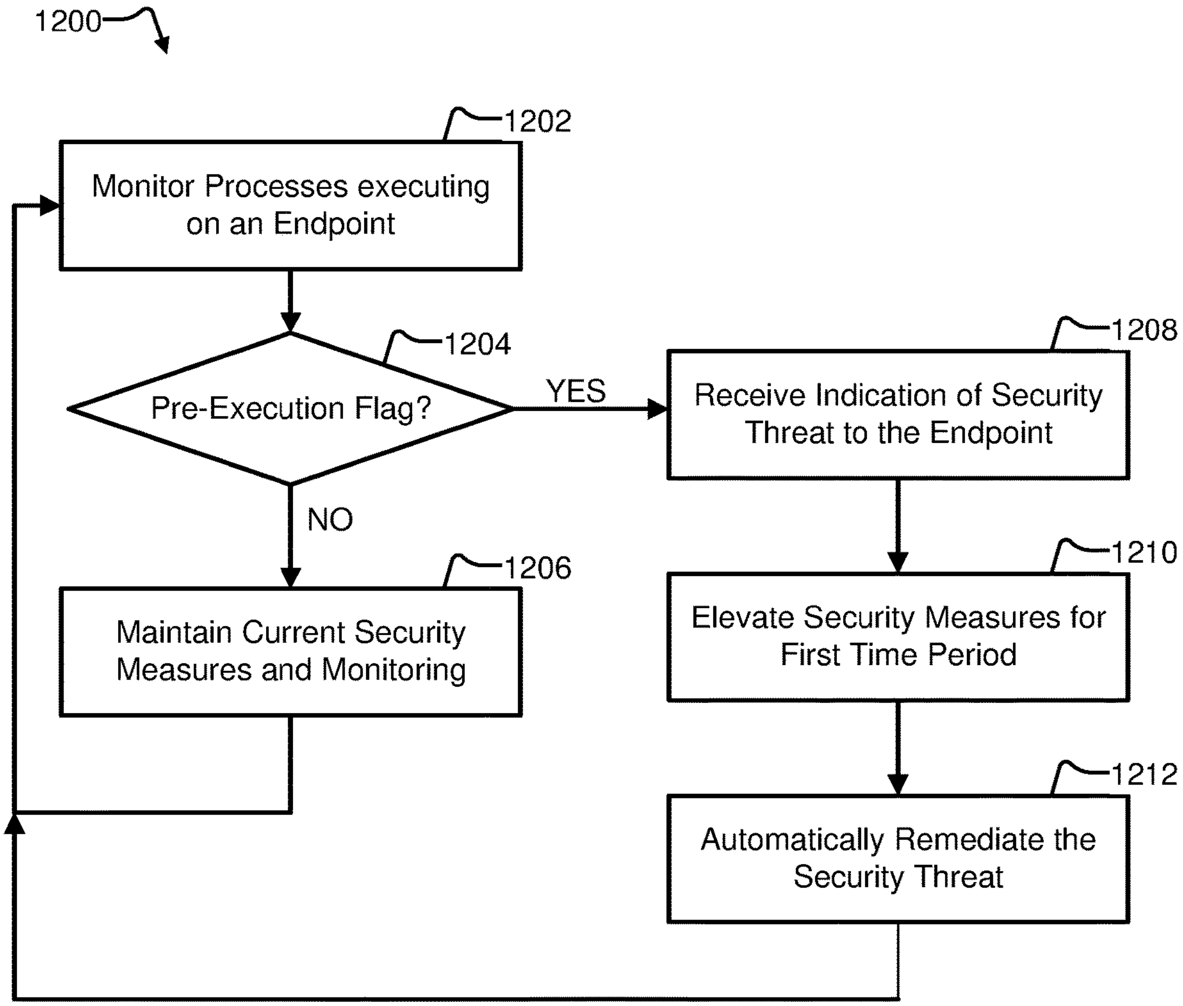
FIG. 12 is a flow diagram of an example method to mitigate user device security threats, in accordance with some implementations.

In addition to those features described above, other threat indicators including pre-execution flags and/or flags indicative of possible code injection threats may be implemented in some implementations. For example, FIGS. 10-12 illustrate various examples where code injection precautions may be utilized to augment or otherwise improve threat detection and mitigation techniques.

Figure 10:
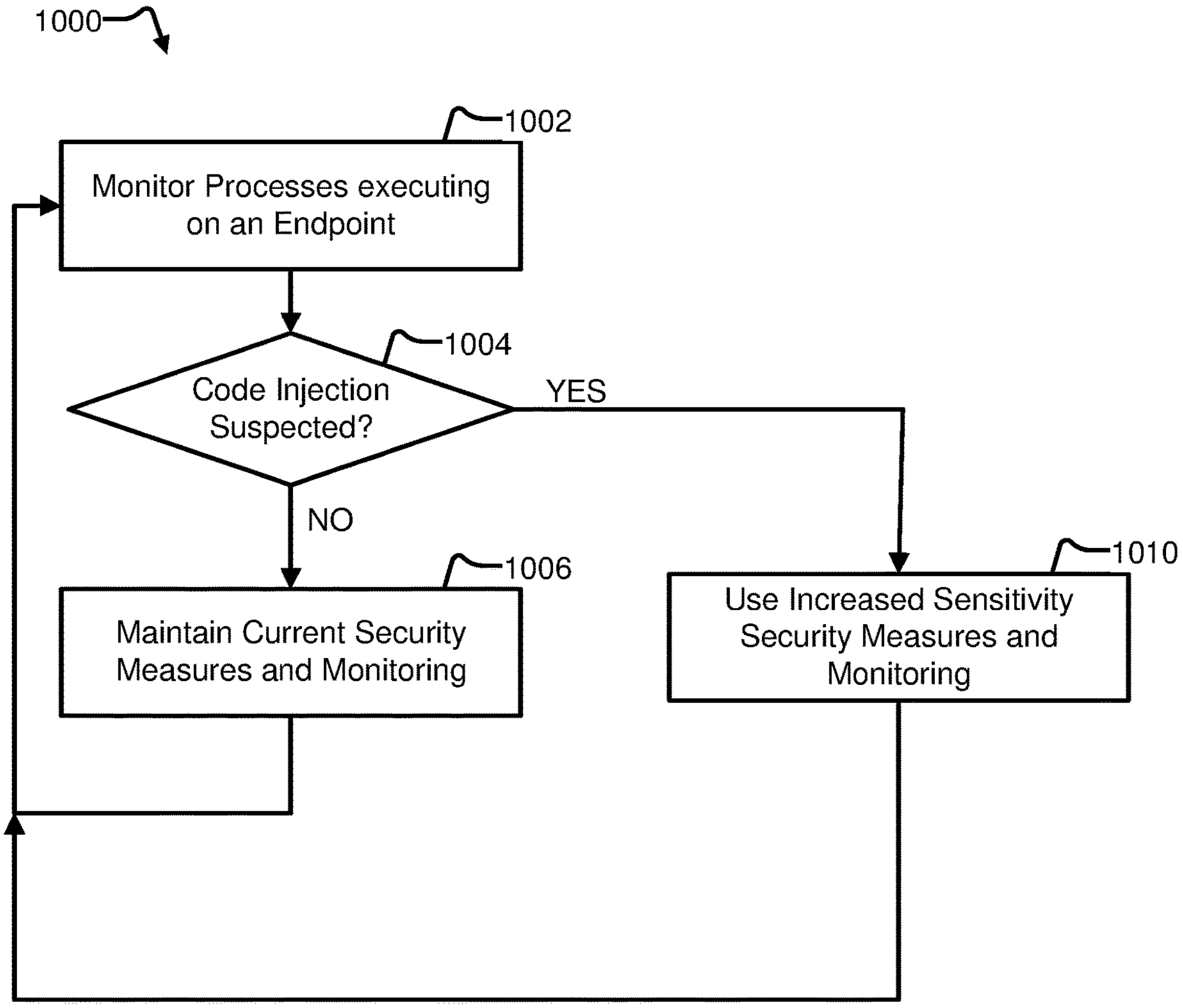
FIG. 10 is a flow diagram of an example method to mitigate user device security threats, in accordance with some implementations.

FIG. 10 is a flow diagram of an additional example method to mitigate user device security threats, in accordance with some implementations. In some implementations, method 1000 can be implemented, for example, at a threat management facility such as facilities 100, 308, and 408 described with reference to FIGS. 1-4. In some implementations, method 1000 can be implemented, for example, on server 406 described with reference to FIG. 4. In some implementations, method 1000 can be implemented by a network monitor such as network monitor 432, or on an endpoint agent, such as security agent S of FIGS. 1-2. In some implementations, some or all of the method 1000 can be implemented on one or more client devices, or on one or more server device(s), and/or on a combination of server device(s) and client device(s). In described examples, the implementing system includes one or more digital processors or processing circuitry ("processors"), and one or more storage devices (e.g., a data store 304, data lake 427, or other storage). In some implementations, different components of one or more servers and/or clients can perform different blocks or other parts of the method 1000. In some examples, a first device is described as performing blocks of method 1000. Some implementations can have one or more blocks of method 1000 performed by one or more other devices (e.g., other client devices or server devices) that can send results or data to the first device.

In some implementations, the method 1000, or portions of the method, can be initiated automatically by a system. In some implementations, the implementing system is a first device. For example, the method (or portions thereof) can be periodically performed, or performed based on one or more particular events or conditions, e.g., a number of potential threats being above a threshold, new patterns of network activity becoming available to a threat management facility, and/or one or more other conditions occurring which can be specified in settings read by the method.

In general, a firewall or network monitor (e.g., such as threat management facility 100 or network monitor 432) can receive process information from an endpoint (e.g., endpoint 12, 22, etc.) to identify a security threat on the endpoint. The firewall or network monitor also may be notified about indications of security threats issued by security monitors on an endpoint, or on other endpoints.

In general, various detection techniques are used to identify potential threats. For example, machine learning techniques may be used to evaluate suspiciousness based on activity related to a monitored endpoint. Additionally, any of the threat management facilities and sub-components may monitor endpoints for potential indications of security threats. Furthermore, other endpoints may provide indications of security threats to adjacent endpoints or endpoints on a particular sub-portion of a computer network. Based upon outputs of these tools, a remote device or security agent on the affected endpoint may elevate security measures on the device and/or restrict execution of one or more software applications and/or a subset of available software on the affected device. By restricting execution on the endpoint, automated threat mitigation actions can be performed and/or human threat intervention can advantageously be directed toward contexts most appropriate for a particular threat indication, while allowing a sub-portion of functions on the affected endpoint to continue. It is noted that as the elevated security measures and/or restricted execution of a subset of software may still allow the endpoint to process some functions, the affected endpoint may be remediated with a reduction in disruption to the computer network. The method 1000 may commence at block 1002.

At block 1002, processes executing on a user device may be monitored for one or more user devices on the network. Activity for the user devices may be monitored, e.g., using self-reporting by the devices and associated data recorders and/or security agents deployed thereon, such that robust logs of activity are obtained which may be used to train a security status detection model. In addition, network activity may be obtained by monitoring the network on which the devices are deployed, for example, by a firewall, gateway, or other network monitor. Active or potential security threats may be indicated through analysis of the associated activity. The method 1000 continues at block 1004.

At block 1004, it is determined whether code injection is suspected. For example, one or more pre-execution flags may be implemented that are indicative of code injection suspicion. Some example scenarios may include: malformed files that are executable, malformed shared library access files, having simultaneous write and execute functionality, having simultaneous read write and execute functionality, and others. For example, read, write, and execute functionality may be indicated by one or more code segments within an associated file or an associated process in memory. Both memory locations and file storage locations may be scanned by one or more automated tools described in detail above. Furthermore, files and/or processes may be continually scanned and/or monitored to determine whether read, write, and/or execute permissions have changed during execution to further indicate code injection suspicion.

If no code injection is suspected, the method 1000 continues at block 1006. Otherwise, the method 1000 continues at block 1010.

At block 1006, the method may include maintaining a current security level and monitoring at the user device. For example, if no code injection is suspected, security levels can be maintained. It is noted that under some circumstances differing levels of code injection suspicion threshold may be applicable, and therefore differing levels of increased security can be implemented. For example, in these scenarios, one or more levels of increased security, each with increased levels compared to the others, can be implemented. In these scenarios, block 1006 may include increasing the security of the user device to a next level of security, but a maximum level of security may be retained for situations where code injection is suspected. The method may iterate to block 1002 to continue monitoring processes after block 1006.

However, if code injection was suspected at block 1004, the method 1000 continues at block 1010 after block 1004.

At block 1010, software execution on the user device is restricted and security measures on the affected device are elevated. For example, the elevated security measures may include measures to limit network activity, limit account creation, limit disk access, limit resource usage, and others. The elevated security measures may be tailored to limit or mitigate lateral movement of malicious code and/or injected code from the affected user device to other devices, while allowing some functions of the affected user device to continue.

In some implementations, the elevated security measures include preventing network access from the user device. In some implementations, the elevated security measures include preventing execution of untrusted software on the user device. In some implementations, the elevated security measures include preventing creation of new user accounts on the user device. In some implementations, the elevated security measures include preventing creation of a service in a safe mode on the user device. In some implementations, the elevated security measures includes preventing a reboot of the user device into the safe mode. Other variations and implementations are also applicable.

In some implementations, the elevated security measures can also include preventing devices that are suspected to be compromised from connecting to remote network addresses. In some implementations, the elevated security measures can also include preventing devices that are suspected to be compromised from causing configuration changes to the operating system on the device (e.g., any changes, some changes that affect security posture, and others). In some implementations, the elevated security measures can also include preventing devices that are suspected of being compromised from engaging in any software behavior that includes attempts to bypass or impair security software products or portions thereof. In some implementations, the elevated security measures can also include preventing software executing on a device suspected of being compromised from accessing a device registry, particular files, particular process artifacts, and others that are related to credentials or sensitive data. Other variations are also applicable according to some implementations.

In some implementations, the restricting includes restricting execution of a subset of software available on the user device for a first time period. Generally, the first time period is a time period that is defined based on a particular implementation. In some implementations, the time period is about 24-hours. In some implementations, the time period is 24, 48, or 72 hours. In some implementations, the time period is a dynamic period based on a severity of a threat, a device threat type, and/or other considerations.

In some implementations, the subset of software available on the user device comprises at least one software application installed on the user device. In these scenarios, restricting the execution can include restricting, for the at least one software application, one or more of: combinations of command-line parameters; network traffic; file modification; or downloads of specific file types.

In some implementations, the restricting can include restricting initialization of the at least one software application from one or more user accounts, restricting initialization of child processes for the at least one software application, restricting network traffic to only non-file transmissions, and others.

In some implementations, the subset of the software can include a shell application (e.g., such as a power shell, command-line shell, etc.). In these scenarios, restricting execution may include restricting one or more combinations of command-line parameters. These restrictions may provide benefits in disallowing certain activities, while allowing other processing functions to continue.

Upon increasing the sensitivity of security measures on the device at block 1010, the method may also include automatically remediating any potential security threats on the user device. A plurality of different forms of remediation are possible. For example, some remediation procedures are described in detail above, with reference to FIGS. 5, 7, and 9.

The method 1000 may iterate as illustrated, implementing increased or current security levels depending upon code injection suspicions, until a threshold number of cycles has been exhausted, until no potential threats exist, or while a user device is operating and in operative communication with a network. Other threshold conditions for ceasing method 1000 may also be applicable, in some implementations.

As described above, monitoring of processes can include monitoring memory and/or file storage locations. FIG. 11 is a schematic of an endpoint device memory with multiple processes stored thereon, in accordance with some implementations. It is noted that the illustrated schematic has been simplified for clarity. Furthermore, while described as a "memory," the same may represent a physical file storage location or a virtual file storage location, as well.

As shown, the memory 1100 includes one or more blocks 1101 allocated and storing/executing processes 1102, 1104, and 1108. Any number of processes may be apparent in any particular implementation, and it is noted that while illustrated as a particular number of processes, the same is varied depending upon the operation conditions and actual processes executing in practice.

Each process 1102, 1104, and 1108 may include data such as data 1122, data 1142, and/or data 1182. Furthermore, some processes, notably here process 1104, may include injected code segments 1144. In this example, injected code 1144 may be suspected by monitoring a read/write/execute flag for the associated process. For example, read/write/execute flags for each process 1102, 1104, and 1108 are illustrated as 1120, 1140, and/or 1180, respectively.

The flag 1120 denotes read and execute functionality for process 1102. The flag 1140 denotes read, write, and execute functionality for process 1104. The flag 1180 denotes write and execute functionality for process 1108. In this illustrated example, the flags 1140 and 1180 may indicate a suspicion of code injection. For example, the ability to both write to a process or file, and to execute that process or file, may indicate a malformed file or process. Accordingly, injection of code may be suspected and, as in the example of FIG. 10, automated methods of increasing a sensitivity of security measures may be implemented.

The increase of security levels may effectuate automated remediation of the user device such that the processes 1104 and 1108 are scanned, monitored, and determined to be malicious or non-malicious. In this example, the malicious or injected code 1144 may be isolated, sandboxed, deleted, or remediated, among other remediation procedures, such that the user device with memory 1100 is remediated. FIG. 12, below, illustrates one example method that leverages both a pre-execution flag and automatic remediation as described herein.

FIG. 12 is a flow diagram of an additional example method to mitigate user device security threats, in accordance with some implementations. In some implementations, method 1200 can be implemented, for example, at a threat management facility such as facilities 100, 308, and 408 described with reference to FIGS. 1-4. In some implementations, method 1200 can be implemented, for example, on server 406 described with reference to FIG. 4. In some implementations, method 1200 can be implemented by a network monitor such as network monitor 432, or on an endpoint agent, such as security agent S of FIGS. 1-2. In some implementations, some or all of the method 1200 can be implemented on one or more client devices, or on one or more server device(s), and/or on a combination of server device(s) and client device(s). In described examples, the implementing system includes one or more digital processors or processing circuitry ("processors"), and one or more storage devices (e.g., a data store 304, data lake 427, or other storage). In some implementations, different components of one or more servers and/or clients can perform different blocks or other parts of the method 1200. In some examples, a first device is described as performing blocks of method 1200. Some implementations can have one or more blocks of method 1200 performed by one or more other devices (e.g., other client devices or server devices) that can send results or data to the first device.

In some implementations, the method 1200, or portions of the method, can be initiated automatically by a system. In some implementations, the implementing system is a first device. For example, the method (or portions thereof) can be periodically performed, or performed based on one or more particular events or conditions, e.g., a number of potential threats being above a threshold, new patterns of network activity becoming available to a threat management facility, and/or one or more other conditions occurring which can be specified in settings read by the method.

In general, a firewall or network monitor (e.g., such as threat management facility 100 or network monitor 432) can receive process information from an endpoint (e.g., endpoint 12, 22, etc.) to identify a security threat on the endpoint. The firewall or network monitor also may be notified about indications of security threats issued by security monitors on an endpoint, or on other endpoints.

In general, various detection techniques are used to identify potential threats. For example, machine learning techniques may be used to evaluate suspiciousness based on activity related to a monitored endpoint. Additionally, any of the threat management facilities and sub-components may monitor endpoints for potential indications of security threats. Furthermore, other endpoints may provide indications of security threats to adjacent endpoints or endpoints on a particular sub-portion of a computer network. Based upon outputs of these tools, a remote device or security agent on the affected endpoint may elevate security measures on the device and/or restrict execution of one or more software applications and/or a subset of available software on the affected device. By restricting execution on the endpoint, automated threat mitigation actions can be performed and/or human threat intervention can advantageously be directed toward contexts most appropriate for a particular threat indication, while allowing a sub-portion of functions on the affected endpoint to continue. It is noted that as the elevated security measures and/or restricted execution of a subset of software may still allow the endpoint to process some functions, the affected endpoint may be remediated with a reduction in disruption to the computer network. The method 1200 may commence at block 1202.

At block 1202, processes executing on a user device may be monitored for one or more user devices on the network. Activity for the user devices may be monitored, e.g., using self-reporting by the devices and associated data recorders and/or security agents deployed thereon, such that robust logs of activity are obtained which may be used to train a security status detection model. In addition, network activity may be obtained by monitoring the network on which the devices are deployed, for example, by a firewall, gateway, or other network monitor. Active or potential security threats may be indicated through analysis of the associated activity. The method 1200 continues at block 1204.

At block 1204, it is determined whether code injection is suspected. For example, one or more pre-execution flags may be implemented that are indicative of code injection suspicion. Some example scenarios may include: malformed files that are executable, malformed shared library access files, having simultaneous write and execute functionality, having simultaneous read write and execute functionality, and others. For example, read, write, and execute functionality may be indicated by one or more code segments within an associated file or an associated process in memory. Both memory locations and file storage locations may be scanned by one or more automated tools described in detail above. Furthermore, files and/or processes may be continually scanned and/or monitored to determine whether read, write, and/or execute permissions have changed during execution to further indicate code injection suspicion.

If no code injection is suspected, the method 1200 continues at block 1206. Otherwise, the method 1200 continues at block 1208.

At block 1206, the method may include maintaining a current security level and monitoring at the user device. For example, if no code injection is suspected, security levels can be maintained. It is noted that under some circumstances differing levels of code injection suspicion threshold may be applicable, and therefore differing levels of increased security can be implemented. For example, in these scenarios, one or more levels of increased security, each with increased levels compared to the others, can be implemented. In these scenarios, block 1006 may include increasing the security of the user device to a next level of security, but a maximum level of security may be retained for situations where code injection is suspected. The method may iterate to block 1202 to continue monitoring processes after block 1206.

However, if code injection was suspected at block 1204, the method 1200 continues at block 1208 after block 1204.

At block 1208, an indication of security threat is received and a type of threat is determined based on the indication of security threat. For example, the device threat type associated with the indication of security threat may be determined to be one or more different threat types. In general, threat types may be dynamically categorized, based on data related to emerging, known, and unknown threats to computer networks. For example, threat types may be categorized dynamically based on data provided by a threat analysis third party service provider, and/or any other connected service illustrated and described above with reference to FIG. 1 and FIG. 2. In addition, coloring system 410, key management system 412, and/or heartbeat system 414 may provide data on malicious activity that may inform categorization of threat types.

Based on a threat type category, inferences as to a severity of a threat may be made. Threat type categories may include at least: no immediate action required type, and, immediate action required type. In general, threat types of an "immediate action required" type may indicate that increased security measures are appropriate. Other threat type categories including sub-categories may also be applicable. The method 1200 continues at block 1206.

At block 1210, software execution on the user device is restricted based on determined threat type and/or security measures on the affected device are elevated for a first time period. For example, the elevated security measures may include measures to limit network activity, limit account creation, limit disk access, limit resource usage, and others. The elevated security measures may be tailored to limit or mitigate lateral movement of malicious code from the affected user device to other devices, while allowing some functions of the affected user device to continue.

In some implementations, the elevated security measures include preventing network access from the user device. In some implementations, the elevated security measures include preventing execution of untrusted software on the user device. In some implementations, the elevated security measures include preventing creation of new user accounts on the user device. In some implementations, the elevated security measures include preventing creation of a service in a safe mode on the user device. In some implementations, the elevated security measures includes preventing a reboot of the user device into the safe mode. Other variations and implementations are also applicable.

In some implementations, the restricting includes restricting execution of a subset of software available on the user device for a first time period. Generally, the first time period is a time period that is defined based on a particular implementation. In some implementations, the time period is about 24-hours. In some implementations, the time period is 24, 48, or 72 hours. In some implementations, the time period is a dynamic period based on a severity of a threat, a device threat type, and/or other considerations.

In some implementations, the subset of software available on the user device comprises at least one software application installed on the user device. In these scenarios, restricting the execution can include restricting, for the at least one software application, one or more of: combinations of command-line parameters; network traffic; file modification; or downloads of specific file types.

In some implementations, the restricting can include restricting initialization of the at least one software application from one or more user accounts, restricting initialization of child processes for the at least one software application, restricting network traffic to only non-file transmissions, and others.

In some implementations, the subset of the software can include a shell application (e.g., such as a power shell, command-line shell, etc.). In these scenarios, restricting execution may include restricting one or more combinations of command-line parameters. These restrictions may provide benefits in disallowing certain activities, while allowing other processing functions to continue.

The method 1200 continues at block 1212.

At block 1212, the security threat on the affected user device may be automatically remediated within the first time period. The automatic remediation can be effectuated by a security agent or software executing on the user device, or remote security software. For example, a security agent on the user device may be directed to remediate the threat causing the indication of security threat on the user device.

In some implementations, a remote device may direct security software (or the security agent) on the user device to initiate the remediation process. The remote device may monitor progress of the remediation, cause updates to a security status of the user device based on the remediation, and so on. Upon remediation of the security threat, or upon expiration of the first time period, the elevated security measures (e.g., on the user device) may be reversed and/or relaxed.

The method 1200 may iterate as illustrated, implementing increased or current security levels depending upon code injection suspicions, until a threshold number of cycles has been exhausted, until no potential threats exist, or while a user device is operating and in operative communication with a network. Other threshold conditions for ceasing method 1200 may also be applicable, in some implementations.

As described above, a system for computer assisted remediation of security threats may include a memory storing a security software configured to restrict software execution on a user device based on a plurality of threat factors. The system may also include a threat management facility configured to apply a security status detection model to identify emerging security threats. The system may also include a remote device to direct a user device to elevate security measures and/or restrict software execution in order to limit or mitigate lateral movement of malicious code during remediation. Other variations and additions are also applicable.

Hereinafter, a more detailed description of various computing devices that may be used to implement different devices (e.g., the server 14 and/or endpoints 12, 22) illustrated in FIG. 1 and FIG. 2 is provided with reference to FIG. 13.

Figure 13:
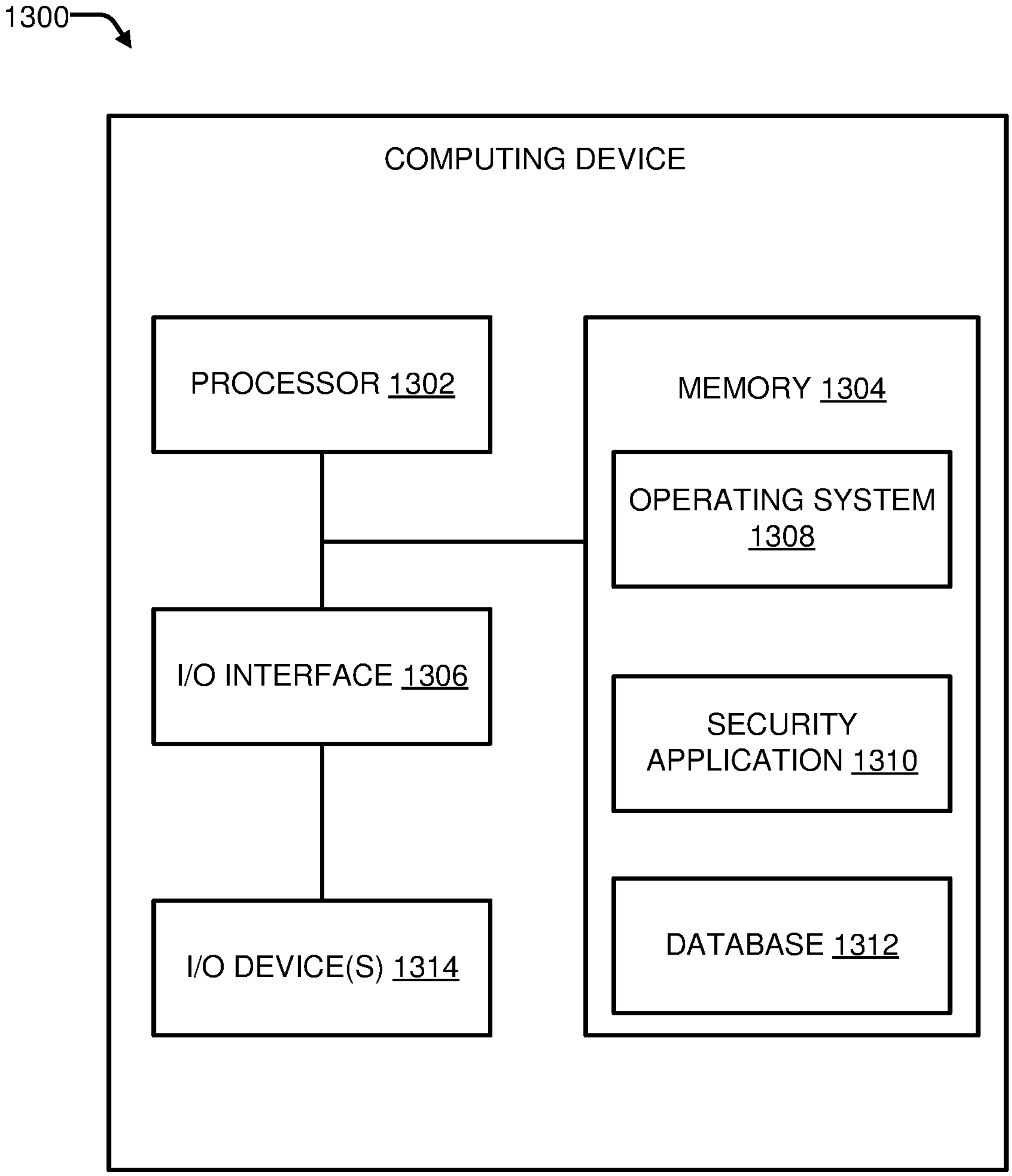
FIG. 13 is a block diagram illustrating an example computing device which may be used to implement one or more features described herein, in accordance with some implementations.

FIG. 13 is a block diagram of an example computing device 1300 which may be used to implement one or more features described herein, in accordance with some implementations. In one example, device 1300 may be used to implement a computer device, (e.g., 110 of FIG. 1), and perform appropriate method implementations described herein. Computing device 1300 can be any suitable computer system, server, or other electronic or hardware device. For example, the computing device 1300 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 1300 includes a processor 1302, a memory 1304, input/output (I/O) interface 1306, and audio/video input/output devices 1314 (e.g., display screen, touchscreen, display goggles or glasses, audio speakers, microphone, etc.).

Processor 1302 can be one or more processors and/or processing circuits to execute program code and control basic operations of the device 1300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 1304 is typically provided in device 1300 for access by the processor 1302, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 1302 and/or integrated therewith. Memory 1304 can store software operating on the server device 1300 by the processor 1302, including an operating system 1308, a security application or computer program product 1310, and a database 1312.

Memory 1304 can include software instructions for executing the operations as described with reference to FIG. 1, FIG. 4, FIG. 5, FIG. 6, FIG. 7, FIG. 8, FIG. 9, FIG. 10, and FIG. 12. Any of software in memory 1304 can alternatively be stored on any other suitable storage location or computer-readable medium. In addition, memory 1304 (and/or other connected storage device(s)) can store instructions and data used in the features described herein. Memory 1304 and any other type of storage (magnetic disk, optical disk, magnetic tape, or other tangible media) can be considered "storage" or "storage devices."

I/O interface 1306 can provide functions to enable interfacing the server device 1300 with other systems and devices. For example, network communication devices, storage devices (e.g., memory and/or data store 116), and input/output devices can communicate via interface 1306. In some implementations, the I/O interface can connect to interface devices including input devices (keyboard, pointing device, touchscreen, microphone, camera, scanner, etc.) and/or output devices (display device, speaker devices, printer, motor, etc.).

For ease of illustration, FIG. 13 shows one block for each of processor 1302, memory 1304, I/O interface 1306, software blocks 1308, and 1310, and database 1312. These blocks may represent one or more processors or processing circuitries, operating systems, memories, I/O interfaces, applications, and/or software modules. In other implementations, device 1300 may not have all of the components shown and/or may have other elements including other types of elements instead of, or in addition to, those shown herein.

A user device can also implement and/or be used with features described herein. Example user devices can be computer devices including some similar components as the device 1300, e.g., processor(s) 1302, memory 1304, and I/O interface 1306. An operating system, software and applications suitable for the client device can be provided in memory and used by the processor. The I/O interface for a user device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 1314, for example, can be connected to (or included in) the device 1300 to display images, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more user devices, servers, and threat management facilities. In some implementations, one or more methods described herein can be implemented, for example, on a server system with a dedicated threat management facility, and/or on both a server system and any number of threat management facilities. In some implementations, different components of one or more servers and or user devices can perform different blocks, operations, or other parts of the methods.

One or more methods described herein (e.g., methods 500, 600, 700, 800, 900, 1000, and 1200) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

Example Clauses

Clause 1. A computer-implemented method to automatically elevate security measures associated with a computer network, the method comprising: monitoring network traffic on a computer network that includes a plurality of endpoints, wherein the network traffic for each endpoint includes data indicative of computer-executable code executing on each endpoint; detecting an indication of a security threat to at least one endpoint of the plurality of endpoints based on the monitoring, the indication of security threat associated with a device threat type; determining that the device threat type is a threat type that requires elevated security measures; responsive to the determining that the device threat type requires elevated security measures, updating a network-access policy for the plurality of endpoints with the threat type, wherein the updating comprises establishing a new or updated rule to limit communication between the at least one endpoint and other endpoints of the plurality of endpoints; and after the updating, automatically remediating the security threat on the at least one endpoint within a first time period.

Clause 2. The subject matter of any preceding clause, wherein detecting the indication of the security threat comprises at least one of: receiving the indication of the security threat on the at least one endpoint from security software that executes on the at least one endpoint; or receiving the indication of the security threat on the at least one endpoint from a remote device in operative communication with the computer network, the indication of the security threat based upon network activity from the at least one endpoint detected by the remote device.

Clause 3. The subject matter of any preceding clause, wherein the device threat type is automatically monitored by at least one of: security software that executes on the at least one endpoint, or a remote device in operative communication with the user device over the computer network.

Clause 4. The subject matter of any preceding clause, wherein the threat type is a computer security threat associated with a plurality of known and unknown security threats to computer networks.

Clause 5. The subject matter of any preceding clause, further comprising actively identifying the at least one endpoint as a security risk for the computer network in the network-access policy in response to the updating.

Clause 6. The subject matter of any preceding clause, wherein the new or updated rule directs other endpoints to ignore data transmitted from the at least one endpoint.

Clause 7. The subject matter of any preceding clause, further comprising: transmitting a command to the at least one endpoint, responsive to the updating, to elevate security measures associated with the at least one endpoint for a first time period; and after the elevating, transmitting another command to the at least one endpoint directing security software executing on the at least one endpoint to remediate the security threat within the first time period.

Clause 8. The subject matter of any preceding clause, further comprising: receiving an indication of remediation of the security threat from the security software executing on the at least one endpoint; and responsive to the indication of remediation, reversing the updating of the network-access policy.

Clause 9. The subject matter of any preceding clause, wherein elevating security measures associated with the at least one endpoint comprises sending a command to the at least one endpoint to perform at least one of: prevent creation of a service in a safe mode on the endpoint or prevent reboot of the endpoint into the safe mode during the first time period.

Clause 10. The subject matter of any preceding clause, wherein the first time period is a time period selected from the group consisting of: 24-hours, 48-hours, and 72-hours.

Clause 11. The subject matter of any preceding clause, wherein the first time period is a dynamic time period defined by on one or more of: the indication of security threat; security software executing on the at least one endpoint; or a remote device in operative communication with the at least one endpoint over the computer network.

Clause 12. The subject matter of any preceding clause, wherein the dynamic time period includes a minimum and maximum amount of time for the first time period.

Clause 13. A non-transitory computer-readable medium with instructions stored thereon that, responsive to execution by a processing device, causes the processing device to perform operations comprising: monitoring network traffic on a computer network that includes a plurality of endpoints, wherein the network traffic for each endpoint includes data indicative of computer-executable code executing on each endpoint; detecting an indication of a security threat to at least one endpoint of the plurality of endpoints based on the monitoring, the indication of security threat associated with a device threat type; determining that the device threat type is a threat type that requires elevated security measures; responsive to the determining that the device threat type requires elevated security measures, updating a network-access policy for the plurality of endpoints with the threat type, wherein the updating comprises establishing a new or updated rule to limit communication between the at least one endpoint and other endpoints of the plurality of endpoints; and after the updating, automatically remediating the security threat on the at least one endpoint within a first time period.

Clause 14. The subject matter of any preceding clause, wherein detecting the indication of the security threat comprises at least one of: receiving the indication of the security threat on the at least one endpoint from security software that executes on the at least one endpoint; or receiving the indication of the security threat on the at least one endpoint from a remote device in operative communication with the computer network, the indication of the security threat based upon network activity from the at least one endpoint detected by the remote device.

Clause 15. The subject matter of any preceding clause, wherein the device threat type is automatically monitored by at least one of: security software that executes on the at least one endpoint, or a remote device in operative communication with the user device over the computer network.

Clause 16. The subject matter of any preceding clause, wherein the threat type is a computer security threat associated with a plurality of known and unknown security threats to computer networks.

Clause 17. The subject matter of any preceding clause, the operations further comprising actively identifying the at least one endpoint as a security risk for the computer network in the network-access policy in response to the updating.

Clause 18. The subject matter of any preceding clause, wherein the new or updated rule directs other endpoints to ignore data transmitted from the at least one endpoint.

Clause 19. The subject matter of any preceding clause, the operations further comprising: transmitting a command to the at least one endpoint, responsive to the updating, to elevate security measures associated with the at least one endpoint for a first time period; and after the elevating, transmitting another command to the at least one endpoint directing security software executing on the at least one endpoint to remediate the security threat within the first time period.

Clause 20. A threat management computer system to manage active security threats on an enterprise network, comprising: a memory with instructions stored thereon; a processing device, coupled to the memory, the processing device configured to access the memory and execute the instructions; and a network device coupled to the processing device and configured to update network policies for a plurality of endpoints, wherein the instructions cause the processing device to perform operations including: monitoring network traffic on a computer network that includes the plurality of endpoints, wherein the network traffic for each endpoint includes data indicative of computer-executable code executing on each endpoint; detecting an indication of a security threat to at least one endpoint of the plurality of endpoints based on the monitoring, the indication of security threat associated with a device threat type; determining that the device threat type is a threat type that requires elevated security measures; responsive to the determining that the device threat type requires elevated security measures, updating a network-access policy for the plurality of endpoints with the threat type, wherein the updating comprises establishing a new or updated rule to limit communication between the at least one endpoint and other endpoints of the plurality of endpoints; and after the updating, automatically remediating the security threat on the at least one endpoint within a first time period.

Clause 21. A computer-implemented method to automatically elevate security measures on a user device, the method comprising: receiving an indication of a security threat to the user device, the indication of security threat associated with a device threat type; determining that the device threat type is a threat type that requires elevated security measures; responsive to the determining that the device threat type requires elevated security measures, elevating security measures associated with the user device for a first time period; and after the elevating, automatically remediating the security threat on the user device within the first time period.

Clause 22. The subject matter of any preceding clause, wherein receiving the indication of the security threat comprises at least one of: receiving the indication of the security threat on the user device from security software that executes on the user device; or receiving the indication of the security threat on the user device from a remote device in operative communication with the user device over a network, the indication of the security threat based upon network activity from the user device detected by the remote device.

Clause 23. The subject matter of any preceding clause, wherein the device threat type is automatically monitored by at least one of: security software that executes on the user device, or a remote device in operative communication with the user device over a network.

Clause 24. The subject matter of any preceding clause, wherein the threat type is a computer security threat associated with a plurality of known and unknown security threats to computer networks.

Clause 25. The subject matter of any preceding clause, wherein elevating security measures associated with the user device comprises sending a command to the user device to prevent network access from the user device during the first time period.

Clause 26. The subject matter of any preceding clause, wherein elevating security measures associated with the user device comprises sending a command to the user device to prevent execution of untrusted software on the user device during the first time period.

Clause 27. The subject matter of any preceding clause, wherein elevating security measures associated with the user device comprises sending a command the user device to prevent creation of new user accounts on the user device during the first time period.

Clause 28. The subject matter of any preceding clause, wherein elevating security measures associated with the user device comprises sending a command the user device to perform at least one of: prevent creation of a service in a safe mode on the user device or prevent reboot of the user device into the safe mode during the first time period.

Clause 29. The subject matter of any preceding clause, wherein automatically remediating the security threat comprises: sending a command to security software that executes on the user device to implement a remediation technique on the user device.

Clause 30. The subject matter of any preceding clause, further comprising: determining, after the elevating, that the device threat type for the user device is remediated; and responsive to the determining that the device threat type is remediated, updating the device security measures associated with the user device to a normal security level.

Clause 31. The subject matter of any preceding clause, further comprising: determining, after expiration of the first time period, that the device threat type for the user device has not been remediated; and responsive to the determining that the device threat type has not been remediated, maintaining the elevated security measures for a second time period.

Clause 32. The subject matter of any preceding clause, wherein receiving the indication of security threat is based on security software that executes on the user device determining that at least one behavioral rule of a plurality of behavioral rules is satisfied, wherein the plurality of behavioral rules include rules to detect one or more known hacking toolsets.

Clause 33. The subject matter of any preceding clause, wherein the first time period is a time period selected from the group consisting of: 24-hours, 48-hours, and 72-hours.

Clause 34. The subject matter of any preceding clause, wherein the first time period is a dynamic time period defined by on one or more of: the indication of security threat; security software executing on the user device; or a remote device in operative communication with the user device over a network.

Clause 35. The subject matter of any preceding clause, wherein the dynamic time period includes a minimum and maximum amount of time for the first time period.

Clause 36. A non-transitory computer-readable medium with instructions stored thereon that, responsive to execution by a processing device, causes the processing device to perform operations comprising: receiving an indication of a security threat to the user device, the indication of security threat associated with a device threat type; determining that the device threat type is a threat type that requires elevated security measures; responsive to the determining that the device threat type requires elevated security measures, elevating security measures associated with the user device for a first time period; and after the elevating, automatically remediating the security threat on the user device within the first time period.

Clause 37. The subject matter of any preceding clause, wherein elevating security measures associated with the user device comprises one or more of: sending a command to the user device to prevent network access from the user device during the first time period; sending a command to the user device to prevent execution of untrusted software on the user device during the first time period; sending a command the user device to prevent creation of new user accounts on the user device during the first time period; sending a command the user device to prevent creation of a service in a safe mode on the user device; or sending a command the user device to prevent reboot of the user device into the safe mode during the first time period.

Clause 38. The subject matter of any preceding clause, wherein receiving the indication of the security threat comprises at least one of: receiving the indication of the security threat on the user device from security software that executes on the user device; or receiving the indication of the security threat on the user device from a remote device in operative communication with the user device over a network, the indication of the security threat based upon network activity from the user device detected by the remote device.

Clause 39. The subject matter of any preceding clause, wherein the first time period is a dynamic time period comprising a minimum and maximum amount of time for the first time period defined by on one or more of: the indication of security threat; security software executing on the user device; or a remote device in operative communication with the user device over a network.

Clause 40. A threat management computer system to manage active security threats on an enterprise network, comprising: a memory with instructions stored thereon; a processing device, coupled to the memory, the processing device configured to access the memory and execute the instructions; and a network device coupled to the processing device and configured to receive indications of security threats from a plurality of user devices, wherein the instructions cause the processing device to perform operations including: receiving an indication of a security threat to a user device of the plurality of user devices, the indication of security threat associated with a device threat type; determining that the device threat type is a threat type that requires elevated security measures; responsive to the determining that the device threat type requires elevated security measures, elevating security measures associated with the user device for a first time period; and after the elevating, automatically remediating the security threat on the user device within the first time period.

Clause 41. A computer-implemented method to automatically elevate security measures on a user device, the method comprising: receiving an indication of a security threat to the user device, the indication of security threat associated with a device threat type; determining that the device threat type is a threat type that requires elevated security measures; responsive to the determining that the device threat type requires elevated security measures, restricting execution of a subset of software available on the user device for a first time period; and after the elevating, automatically remediating the security threat on the user device within the first time period.

Clause 42. The subject matter of any preceding clause, wherein the subset of software available on the user device comprises at least one software application installed on the user device.

Clause 43. The subject matter of any preceding clause, wherein restricting the execution comprises restricting, for the at least one software application, one or more of: combinations of command-line parameters; network traffic; file modification; or downloads of specific file types.

Clause 44. The subject matter of any preceding clause, wherein restricting the execution comprises restricting initialization of the at least one software application from one or more user accounts.

Clause 45. The subject matter of any preceding clause, wherein restricting the execution comprises restricting initialization of child processes for the at least one software application.

Clause 46. The subject matter of any preceding clause, wherein restricting the execution comprises restricting network traffic to only non-file transmissions.

Clause 47. The subject matter of any preceding clause, wherein the subset of software available on the user device comprises a shell application, and wherein restricting the execution comprises restricting one or more combinations of command-line parameters.

Clause 48. A non-transitory computer-readable medium with instructions stored thereon that, responsive to execution by a processing device, causes the processing device to perform operations comprising: receiving an indication of a security threat to the user device, the indication of security threat associated with a device threat type; determining that the device threat type is a threat type that requires elevated security measures; responsive to the determining that the device threat type requires elevated security measures, restricting execution of a subset of software available on the user device for a first time period; and after the elevating, automatically remediating the security threat on the user device within the first time period.

Clause 49. The subject matter of any preceding clause, wherein the subset of software available on the user device comprises at least one software application installed on the user device.

Clause 50. The subject matter of any preceding clause, wherein restricting the execution comprises restricting, for the at least one software application, one or more of: combinations of command-line parameters; network traffic; file modification; or downloads of specific file types.

Clause 51. The subject matter of any preceding clause, wherein restricting the execution comprises restricting initialization of the at least one software application from one or more user accounts.

Clause 52. The subject matter of any preceding clause, wherein restricting the execution comprises restricting initialization of child processes for the at least one software application.

Clause 53. The subject matter of any preceding clause, wherein restricting the execution comprises restricting network traffic to only non-file transmissions.

Clause 54. The subject matter of any preceding clause, wherein the subset of software available on the user device comprises a shell application, and wherein restricting the execution comprises restricting one or more combinations of command-line parameters.

Clause 55. A threat management computer system to manage active security threats on an enterprise network, comprising: a memory with instructions stored thereon; a processing device, coupled to the memory, the processing device configured to access the memory and execute the instructions; and a network device coupled to the processing device and configured to receive indications of security threats from a plurality of user devices, wherein the instructions cause the processing device to perform operations including: receiving an indication of a security threat to a user device of the plurality of user devices, the indication of security threat associated with a device threat type; determining that the device threat type is a threat type that requires elevated security measures; responsive to the determining that the device threat type requires elevated security measures, restricting execution of a subset of software available on the user device for a first time period; and after the elevating, automatically remediating the security threat on the user device within the first time period.

Clause 56. The subject matter of any preceding clause, wherein the subset of software available on the user device comprises at least one software application installed on the user device.

Clause 57. The subject matter of any preceding clause, wherein restricting the execution comprises restricting, for the at least one software application, one or more of: combinations of command-line parameters; network traffic; file modification; or downloads of specific file types.

Clause 58. The subject matter of any preceding clause, wherein restricting the execution comprises restricting initialization of the at least one software application from one or more user accounts.

Clause 59. The subject matter of any preceding clause, wherein restricting the execution comprises restricting initialization of child processes for the at least one software application.

Clause 60. The subject matter of any preceding clause, wherein restricting the execution comprises restricting network traffic to only non-file transmissions.

Clause 61. A computer-implemented method to automatically elevate security measures on a user device, the method comprising: monitoring a plurality of processes executing on the user device to identify a pre-execution flag associated with at least one process of the plurality of processes; and responsive to identifying the pre-execution flag: receiving an indication of a security threat to the user device, the indication of security threat associated with the at least one process and a device threat type; responsive to the receiving the indication of the security threat, elevating security measures associated with the user device for a first time period; and after the elevating, automatically remediating the security threat on the user device within the first time period.

Clause 62. The subject matter of any preceding clause, wherein the pre-execution flag indicates that the at least one process comprises one or more code segments that are both readable and writeable during execution.

Clause 63. The subject matter of any preceding clause, wherein the pre-execution flag indicates that the at least one process comprises one or more code segments that are marked for simultaneous read, write, and execute access.

Clause 64. The subject matter of any preceding clause, wherein the at least one process is associated with a shared library of an operating system of the user device.

Clause 65. The subject matter of any preceding clause, wherein the shared library is associated with library linking between programs executing on the user device.

Clause 66. The subject matter of any preceding clause, wherein the shared library is a Dynamic-Linked Library (DLL) file.

Clause 67. The subject matter of any preceding clause, wherein the shared library is associated with memory sharing between programs executing on the operating system.

Clause 68. The subject matter of any preceding clause, wherein receiving the indication of the security threat comprises at least one of: receiving the indication of the security threat on the user device from security software that executes on the user device; or receiving the indication of the security threat on the user device from a remote device in operative communication with the user device over a network, the indication of the security threat based upon network activity from the user device detected by the remote device.

Clause 69. The subject matter of any preceding clause, wherein the device threat type is automatically monitored by at least one of: security software that executes on the user device, or a remote device in operative communication with the user device over a network.

Clause 70. The subject matter of any preceding clause, wherein the device threat type is a computer security threat associated with a plurality of known and unknown security threats to computer networks.

Clause 71. The subject matter of any preceding clause, wherein elevating security measures associated with the user device comprises configuring the user device to prevent at least one of: network access from the user device during the first time period; execution of untrusted software on the user device during the first time period; creation of new user accounts on the user device during the first time period; creation of a service in a safe mode on the user device; or reboot of the user device into the safe mode during the first time period.

Clause 72. The subject matter of any preceding clause, wherein automatically remediating the security threat comprises: configuring security software that executes on the user device to implement a remediation technique on the user device that remediates the security threat.

Clause 73. The subject matter of any preceding clause, further comprising: determining, after the elevating, that the device threat type for the user device is remediated; and responsive to the determining that the device threat type is remediated, updating the device security measures associated with the user device to a normal security level, wherein the normal security level is associated with disabling one or more of the security measures implemented in the first time period.

Clause 74. The subject matter of any preceding clause, further comprising: determining, after expiration of the first time period, that the device threat type for the user device has not been remediated; and responsive to the determining that the device threat type has not been remediated, maintaining the elevated security measures for a second time period.

Clause 75. The subject matter of any preceding clause, wherein receiving the indication of security threat is based on security software that executes on the user device determining that at least one behavioral rule of a plurality of behavioral rules is satisfied, wherein the plurality of behavioral rules include rules to detect one or more hacking toolsets.

Clause 76. A non-transitory computer-readable medium with instructions stored thereon that, responsive to execution by a processing device, causes the processing device to perform operations comprising: monitoring a plurality of processes executing on a user device to identify a pre-execution flag associated with at least one process; and responsive to identifying the pre-execution flag: receiving an indication of a security threat to the user device, the indication of security threat associated with the at least one process and a device threat type; responsive to the receiving the indication of the security threat, elevating security measures associated with the user device for a first time period; and after the elevating, automatically remediating the security threat on the user device within the first time period.

Clause 77. The subject matter of any preceding clause, wherein the pre-execution flag indicates that: the at least one process comprises one or more code segments that are both readable and writeable during execution; or the at least one process comprises one or more code segments that are marked for read, write, and execution access simultaneously.

Clause 78. The subject matter of any preceding clause, wherein the at least one process is associated with an operating system's shared library file, and wherein the operating system is executing on the user device.

Clause 79. The subject matter of any preceding clause, wherein the shared library file is associated with library linking between programs executing on the operating system or with memory sharing between programs executing on the operating system.

Clause 80. A threat management computer system to manage active security threats on an enterprise network, comprising: a memory with instructions stored thereon; a processing device, coupled to the memory, the processing device configured to access the memory and execute the instructions; and a network device coupled to the processing device and configured to receive indications of security threats from a plurality of user devices, wherein the instructions cause the processing device or the network device to perform operations including: monitoring a plurality of processes executing on a user device of the plurality of user devices to identify a pre-execution flag associated with at least one process; and responsive to identifying the pre-execution flag: receiving an indication of a security threat to the user device, the indication of security threat associated with the at least one process and a device threat type; responsive to the receiving the indication of the security threat, elevating security measures associated with the user device for a first time period; and after the elevating, automatically remediating the security threat on the user device within the first time period.

CONCLUSION

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

It is noted that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method to automatically elevate security measures associated with a computer network, the method comprising:

monitoring activity on one or more devices, communicatively coupled as the computer network, for an active security threat;

detecting an indication of the active security threat to at least one endpoint of a plurality of endpoints based on the monitoring, the indication of the active security threat associated with a device threat type;

determining that the device threat type is a threat type that requires elevated security measures;

responsive to the determining that the device threat type requires elevated security measures, updating a network-access policy for the plurality of endpoints with the threat type, wherein the updating comprises establishing a new or updated rule to limit communication between the at least one endpoint and other endpoints of the plurality of endpoints, and wherein the new or updated rule directs the other endpoints to ignore data transmitted from the at least one endpoint; and after the updating, automatically remediating the active security threat on the at least one endpoint within a first time period.

2. The computer-implemented method of claim 1, wherein detecting the indication of the active security threat comprises at least one of:

receiving the indication of the active security threat on the at least one endpoint from security software that executes on the at least one endpoint; or receiving the indication of the active security threat on the at least one endpoint from a remote device in operative communication with the computer network, the indication of the active security threat based upon network activity from the at least one endpoint detected by the remote device.

3. The computer-implemented method of claim 1, wherein the device threat type is automatically monitored by at least one of: security software that executes on the at least one endpoint, or a remote device in operative communication with the at least one endpoint over the computer network.

4. The computer-implemented method of claim 1, wherein the threat type is a computer security threat associated with a plurality of known and unknown security threats to computer networks.

5. The computer-implemented method of claim 1, further comprising actively identifying the at least one endpoint as a security risk for the computer network in the network-access policy in response to the updating.

6. The computer-implemented method of claim 1, wherein the new or updated rule is effective to limit or mitigate lateral movement of malicious code from the at least one endpoint.

7. The computer-implemented method of claim 1, further comprising:

transmitting a command to the at least one endpoint, responsive to the updating, to elevate security measures associated with the at least one endpoint for the first time period; and after the elevating, transmitting another command to the at least one endpoint directing security software executing on the at least one endpoint to remediate the active security threat within the first time period.

8. The computer-implemented method of claim 7, further comprising:

receiving an indication of remediation of the active security threat from the security software executing on the at least one endpoint; and responsive to the indication of remediation, reversing the updating of the network-access policy.

9. The computer-implemented method of claim 7, wherein elevating security measures associated with the at least one endpoint comprises transmitting the command to the at least one endpoint to perform at least one of: prevent creation of a service in a safe mode on the at least one endpoint or prevent reboot of the at least one endpoint into the safe mode during the first time period.

10. The computer-implemented method of claim 1, wherein the first time period is a time period selected from the group consisting of: 24-hours, 48-hours, and 72-hours.

11. The computer-implemented method of claim 1, wherein the first time period is a dynamic time period defined by one or more of:

the indication of the active security threat;

security software executing on the at least one endpoint; or a remote device in operative communication with the at least one endpoint over the computer network.

12. The computer-implemented method of claim 11, wherein the dynamic time period includes a minimum and maximum amount of time for the first time period.

13. A non-transitory computer-readable medium with instructions stored thereon that, responsive to execution by a processing device, cause the processing device to perform operations comprising:

monitoring activity on one or more devices, communicatively coupled as a computer network, for an active security threat;

detecting an indication of the active security threat to at least one endpoint of a plurality of endpoints based on the monitoring, the indication of the active security threat associated with a device threat type;

determining that the device threat type is a threat type that requires elevated security measures;

responsive to the determining that the device threat type requires elevated security measures, updating a network-access policy for the plurality of endpoints with the threat type, wherein the updating comprises establishing a new or updated rule to limit communication between the at least one endpoint and other endpoints of the plurality of endpoints, and wherein the new or updated rule directs the other endpoints to ignore data transmitted from the at least one endpoint; and after the updating, automatically remediating the active security threat on the at least one endpoint within a first time period.

14. The non-transitory computer-readable medium of claim 13, wherein detecting the indication of the active security threat comprises at least one of:

receiving the indication of the active security threat on the at least one endpoint from security software that executes on the at least one endpoint; or receiving the indication of the active security threat on the at least one endpoint from a remote device in operative communication with the computer network, the indication of the active security threat based upon network activity from the at least one endpoint detected by the remote device.

15. The non-transitory computer-readable medium of claim 13, wherein the device threat type is automatically monitored by at least one of: security software that executes on the at least one endpoint, or a remote device in operative communication with the at least one endpoint over the computer network.

16. The non-transitory computer-readable medium of claim 13, wherein the threat type is a computer security threat associated with a plurality of known and unknown security threats to computer networks.

17. The non-transitory computer-readable medium of claim 13, the operations further comprising actively identifying the at least one endpoint as a security risk for the computer network in the network-access policy in response to the updating.

18. The non-transitory computer-readable medium of claim 13, wherein the new or updated rule is effective to limit or mitigate lateral movement of malicious code from the at least one endpoint.

19. The non-transitory computer-readable medium of claim 13, the operations further comprising:

transmitting a command to the at least one endpoint, responsive to the updating, to elevate security measures associated with the at least one endpoint for the first time period; and after the elevating, transmitting another command to the at least one endpoint directing security software executing on the at least one endpoint to remediate the active security threat within the first time period.

20. A threat management computer system to manage active security threats on an enterprise network, comprising:

a memory with instructions stored thereon;

a processing device, coupled to the memory, the processing device configured to access the memory and execute the instructions; and a network device coupled to the processing device and configured to update network policies for a plurality of endpoints, wherein the instructions cause the processing device to perform operations including:

monitoring activity on one or more devices, communicatively coupled as a computer network, for an active security threat;

detecting an indication of the active security threat to at least one endpoint of a plurality of endpoints based on the monitoring, the indication of the active security threat associated with a device threat type;

determining that the device threat type is a threat type that requires elevated security measures;

responsive to the determining that the device threat type requires elevated security measures, updating a network-access policy for the plurality of endpoints with the threat type, wherein the updating comprises establishing a new or updated rule to limit communication between the at least one endpoint and other endpoints of the plurality of endpoints, and wherein the new or updated rule directs the other endpoints to ignore data transmitted from the at least one endpoint; and after the updating, automatically remediating the active security threat on the at least one endpoint within a first time period.

* * * * *